US011188890B2

(12) United States Patent
Henderson et al.

(10) Patent No.: US 11,188,890 B2
(45) Date of Patent: *Nov. 30, 2021

(54) DOCUMENT HANDLER SYSTEM AND METHOD WITH TIMED OPERATION

(71) Applicant: JCM American Corporation, Las Vegas, NV (US)

(72) Inventors: Mark Henderson, Las Vegas, NV (US); Bryan Allen Wilcutt, Las Vegas, NV (US); Mark Adams, Las Vegas, NV (US); David Christopher Kubajak, Las Vegas, NV (US); Steven Johnson, Las Vegas, NV (US)

(73) Assignee: JCM American Corporation, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/026,266

(22) Filed: Sep. 20, 2020

(65) Prior Publication Data

US 2021/0004779 A1 Jan. 7, 2021

Related U.S. Application Data

(63) Continuation of application No. 16/911,157, filed on Jun. 24, 2020, now Pat. No. 10,817,859, which is a continuation of application No. 16/777,769, filed on Jan. 30, 2020, now Pat. No. 10,733,585, which is a continuation of application No. 15/665,353, filed on Jul. 31, 2017, now Pat. No. 10,643,194, which is a continuation of application No. 14/033,440, filed on Sep. 21, 2013, now Pat. No. 9,721,241.

(51) Int. Cl.
*G06Q 20/14* (2012.01)
*G07F 19/00* (2006.01)
*G07F 11/00* (2006.01)

(52) U.S. Cl.
CPC .......... *G06Q 20/145* (2013.01); *G07F 11/00* (2013.01); *G07F 19/202* (2013.01)

(58) Field of Classification Search
CPC ...... G06Q 20/145; G07F 11/00; G07F 19/202
USPC ...................................................... 235/380
See application file for complete search history.

(56) References Cited

U.S. PATENT DOCUMENTS

| | | |
|---|---|---|
| 4,139,764 A | 2/1979 | Petrini et al. |
| 4,312,436 A | 1/1982 | Martin et al. |
| 6,917,853 B2 | 7/2005 | Chrinomas |
| 7,035,813 B1 | 4/2006 | Cook |
| 7,059,519 B1 | 6/2006 | Glize |
| 7,389,916 B2 | 6/2008 | Chirnomas |
| 7,641,555 B2 | 1/2010 | McKinley et al. |
| 7,909,699 B2 | 3/2011 | Parrott et al. |
| 9,721,241 B2 | 8/2017 | Henderson et al. |

(Continued)

*Primary Examiner* — Daniel A Hess
(74) *Attorney, Agent, or Firm* — FisherBroyles, LLP; Rob. L. Phillips

(57) ABSTRACT

A document handler system and method includes timed operation functionality in which the manufacturer of the document handler may input coded information in the document handler to establish a timed operation of the document handler which may be contingent on continued payments for use of the document handler. Alternatively, or in addition, the timed operation may be used to establish an appropriate warranty period during which the manufacturer is obligated to provide repairs, modification and/or support for the document handler.

20 Claims, 23 Drawing Sheets

(56) References Cited

U.S. PATENT DOCUMENTS

| | | | |
|---|---|---|---|
| 10,643,194 B2 * | 5/2020 | Henderson | G07F 19/202 |
| 10,733,585 B2 * | 8/2020 | Henderson | G07F 11/00 |
| 10,817,859 B1 * | 10/2020 | Henderson | G07F 11/00 |
| 2002/0116208 A1 | 8/2002 | Chirnomas | |
| 2007/0060302 A1 | 3/2007 | Fabbri | |
| 2008/0275591 A1 | 11/2008 | Chirnomas | |
| 2009/0087076 A1 | 4/2009 | Jenrick et al. | |
| 2009/0149245 A1 | 6/2009 | Fabbri | |
| 2014/0047331 A1 | 2/2014 | Feldman | |

\* cited by examiner

DOCUMENT HANDLER SYSTEM AND METHOD WITH TIMED OPERATION

CROSS-REFERENCE TO RELATED APPLICATION

This application is a continuation of U.S. patent application Ser. No. 16/911,157, filed Jun. 24, 2020, which is a continuation of U.S. patent application Ser. No. 16/777,769, filed Jan. 30, 2020, now U.S. Pat. No. 10,733,585, which is a continuation of U.S. patent application Ser. No. 15/665,353, filed Jul. 31, 2017, now U.S. Pat. No. 10,643,194, which is a continuation of U.S. patent application Ser. No. 14/033,440, filed Sep. 21, 2013, now U.S. Pat. No. 9,721,241, the contents of which are incorporated by reference as if fully disclosed herein.

COPYRIGHT NOTICE

Portions of this disclosure contain material in which copyright is claimed by the applicant. The applicant has no objection to the copying of this material in the course of making copies of the application file or any patents that may issue on the application, but all other rights whatsoever in the copyrighted material are reserved.

BACKGROUND

Document handlers have been in use in electronic gaming machines ("EGMs"), vending machines, automated teller machines ("ATMs") and other devices for some time. The document handler may be sold for use in these devices as an integrated component or as a separate product that may be installed upon purchase. A typical configuration of a document handler for these types of devices has a front operation panel through which documents such as bills or tickets are deposited and from which bills or tickets are dispensed. Once inserted, the document is introduced to one or more validators for validating authenticity, denomination and defacement of the document and for being counted. The document is then routed to one of potentially multiple cashboxes for storage, a reject safe for collecting defaced, rejected or non-recyclable documents or one of a group of escrow reservations for temporarily accumulating documents, stowing the documents into the cashboxes and picking out bills of a designated amount from the cashboxes for payment. The document handler also includes a set of serial passageways for transporting documents one by one among the front operation panel, validators, cashboxes, reject safe and escrow reservations. These serial passageways are typically implemented as a bidirectional path for transporting documents guided along the bidirectional path in the forward and reverse directions. One or more unidirectional paths are also used for transporting documents guided along the unidirectional path in a single direction.

Document handlers are also known to use stackers to stack bills of different denominations. The stackers are fitted with bill conveyors for transporting bills into and out of the stackers along a channel for guiding bills. A bill conveyor has a door that may be opened and closed by rotating the door about a pivot provided at one end of the channel so that the door is closed to form the channel, and it is opened to provide an approach from outside a space for forming the channel.

In EGM applications, document handlers are set up to also accept printed tickets that hold monetary value and may be inserted into an EGM. Once inserted, the document handler reads a code on the ticket to determine a monetary value associated with the ticket. The code (e.g. a bar code) is stored in a system to which the EGM is connected on a network in a gaming establishment. If the code is confirmed as a valid code in a communication exchange between the EGM or the document handler and the system, the value of the code is converted to credits and added to the credit meter on the EGM so that the credits are available to the player to play games on the EGM. Once a player has completed a session of game play on the EGM, he may "cash-out" any remaining credits, in which case a new ticket is printed by a ticket printer which may typically be located inside the EGM, but may also be located outside the EGM, either nearby the EGM or at a remote location. The ticket includes a variety of information such as the value associated with the ticket, a code that is unique to the ticket for security purposes and so that the ticket can be tracked, the date, the name of the gaming establishment issuing the ticket and any other information that the gaming establishment may desire to place on the ticket. The code is stored in the system so that it may be confirmed when the ticket is presented for use at an EGM or at a cashier station to be converted to cash.

As stated above, document handlers are usually sold as an integrated component in a device such as an EGM, ATM, vending machine or change kiosk. Alternatively, a document handler may be sold as a stand-alone device and then placed inside of a device by the purchaser. In either case, a sale price is set for the document handler and it is sold without any limitations on its operation when commercially placed. In some instances, sales of document handlers may be made with financing terms where payments are made over time with interest included in the payments. In such cases, it is not uncommon for the seller of the document handler to make a sale but then for the purchaser to fail to make payments. In addition, it is difficult to track warranty periods for a document handler that may have a certain manufacture date, but which is not actually placed into operation until a later date. In those cases, establishing the expiration date for the warranty may be difficult. For these reasons, it is desirable to provide a document handler that may have a timed operation which can be controlled through activation upon the sale of the document handler or at a later time.

The present invention is a document handler with timed operation functionality in which the manufacturer of the document handler may input coded information in the document handler to establish a timed operation of the document handler which may be contingent on continued payments for use of the document handler. Alternatively, or in addition, the timed operation may be used to establish an appropriate warranty period during which the manufacturer is obligated to provide repairs, modification and/or support for the document handler.

BRIEF DESCRIPTION OF THE DRAWINGS

For a better understanding of the present invention, and to show more clearly how it functions, reference will now be made, by way of example, to the accompanying drawings. The drawings show embodiments of the present invention in which.

DETAILED DESCRIPTION OF THE INVENTION

Figure 1:
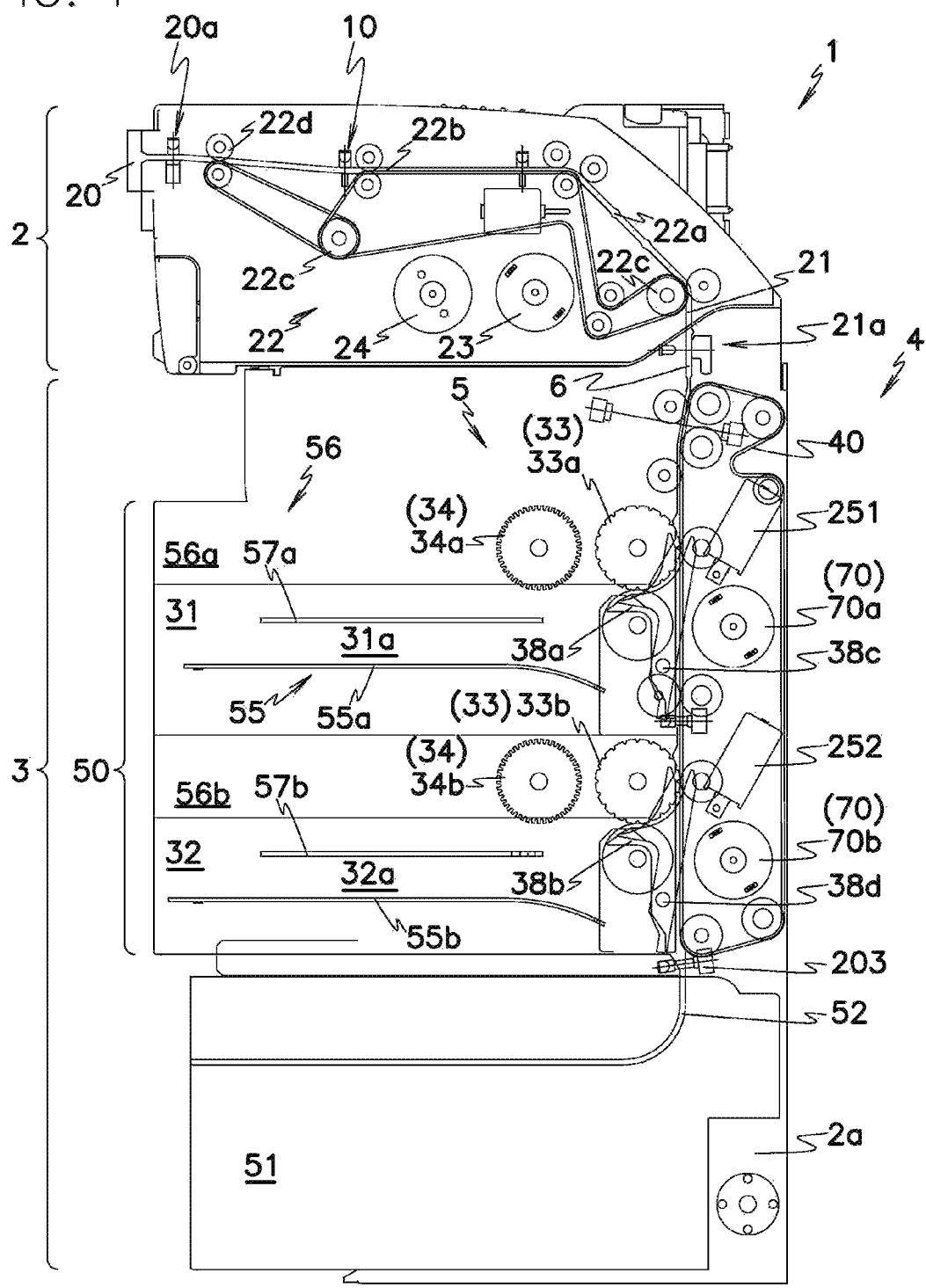
FIG. 1 is a sectional view showing a document handler.

The present invention will now be described more fully with reference to the accompanying drawings. It should be understood that the invention may be embodied in many different forms and should not be construed as limited to the embodiments set forth herein. Throughout FIGS. 1-26 like elements of the invention are referred to by the same reference numerals for consistency purposes. It should be understood that the terms "bill," "paper currency," "document" and "ticket" are all considered different types of documents that may be handled by the document handler of the present invention and which are used throughout the specification and claims herein. These terms may be interchanged where applicable, and the use of a single one of these terms should not be construed to limit the invention to any one type of document where the use of other types of documents may be applicable.

FIG. 1 shows an embodiment of an examplary document handling device 1 according to the present invention that includes a validator 2 having a frame 2a, a stacker 3 having a storage 50 and an optional container 51, and a main conveyor 4 secured to frame 2a of validator 2 for transporting documents along a main passageway 6. Main passageway 6 is formed between validator 2 and storage 50 of stacker 3. Storage 50 includes upper stacker 31 and lower stacker 32 having upper and lower (first and second) storage spaces 31a and 32a respectively. Storage 50 may be removably attached to frame 2a of validator 2. The embodiment of the present invention contemplates that stacker 3 includes storage 50 for storing documents in an extractable manner, and a single or a group of storage conveyors 5 for placing documents into storage 50 supplied from validator 2 through main conveyor 4, and also for extracting documents stored in storage 50. Main conveyor 4 may also include a reversible motor or motors 70 to which storage conveyors 5 in stacker 3 may be in detachable and driving connection.

Figure 4:
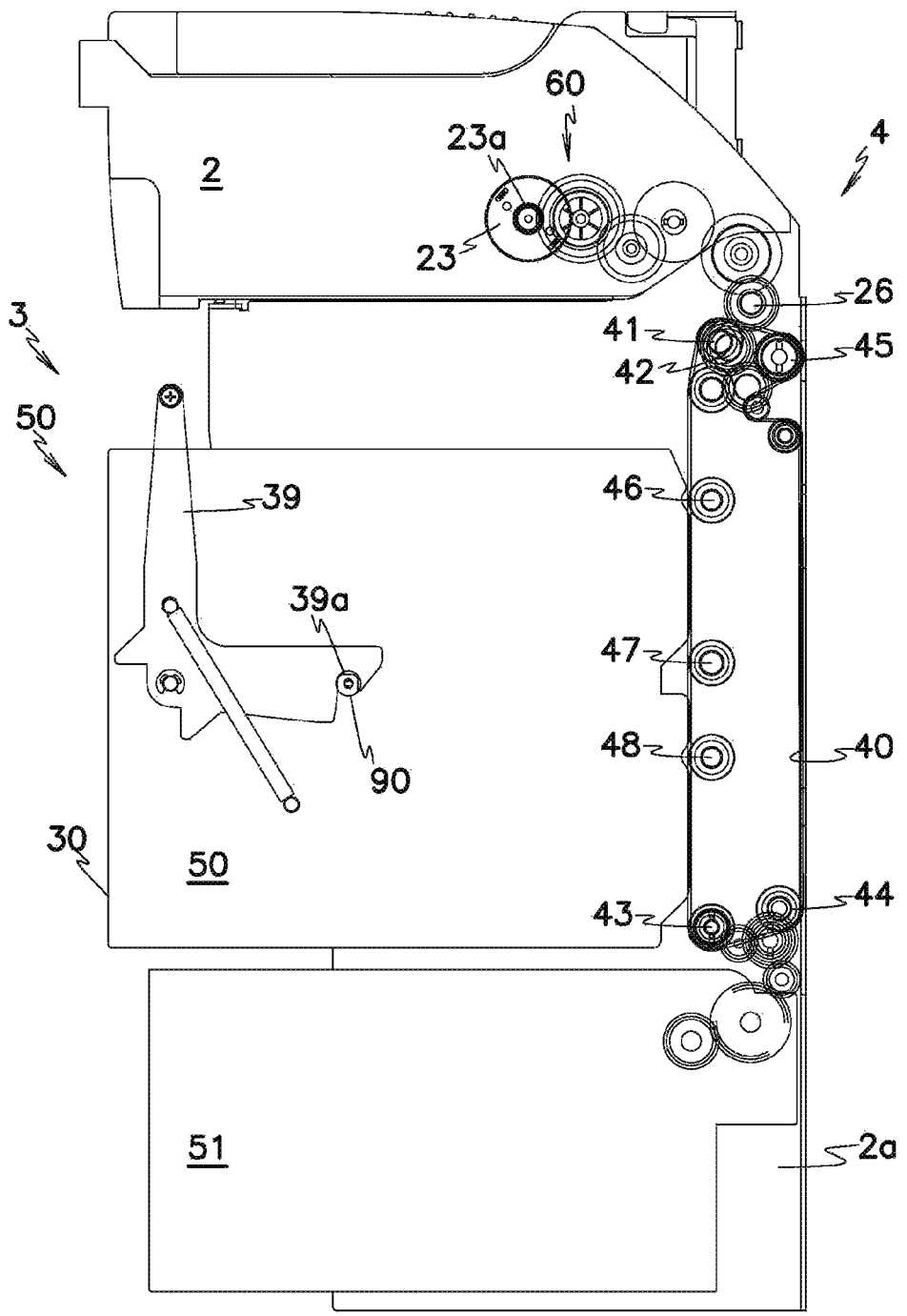
FIG. 4 is a sectional view showing a first gear train of a main conveyor in a document handler.
Figure 5:
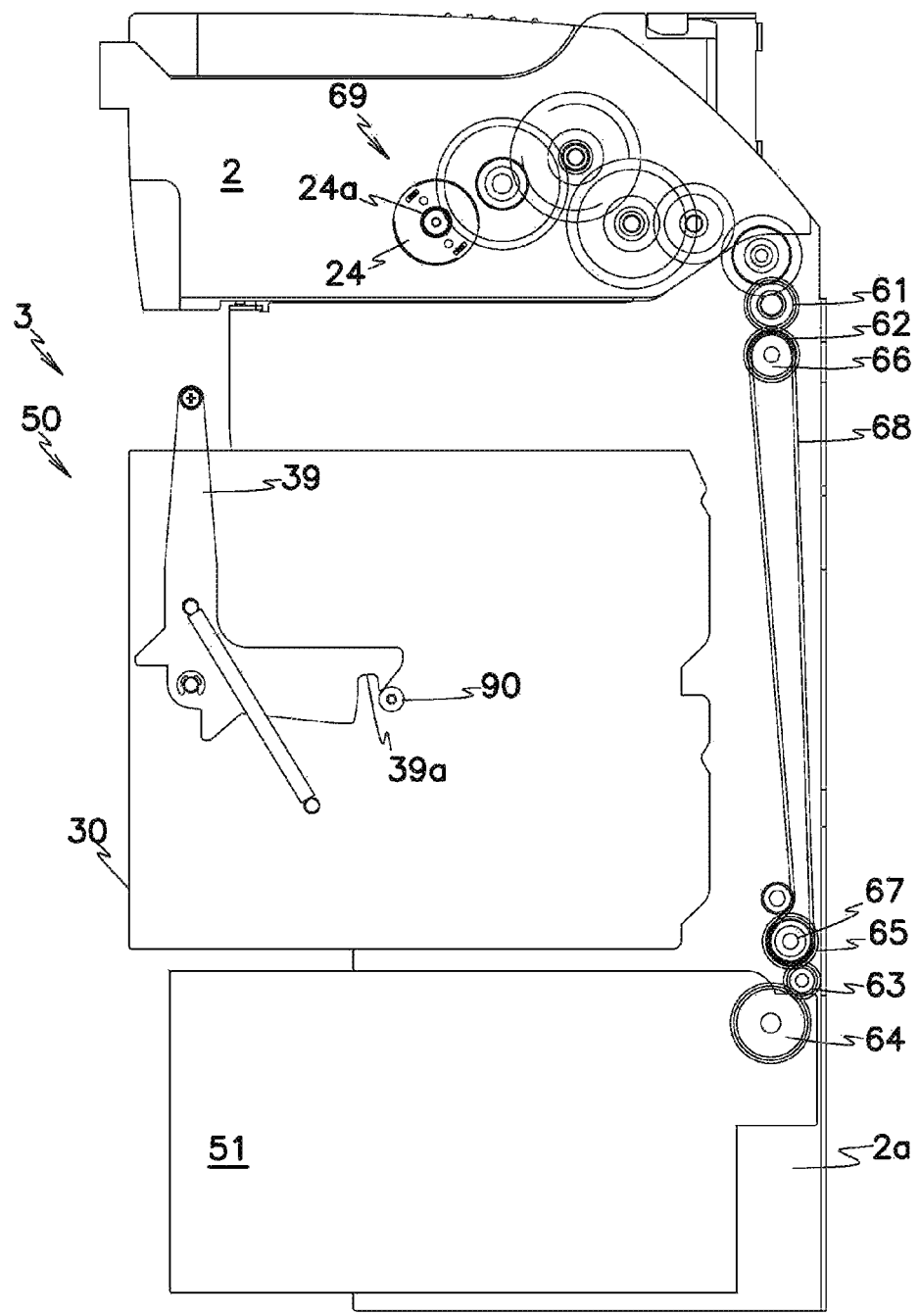
FIG. 5 is a sectional view showing a second gear train for stowing documents into a container in a document handler.

Validator 2 includes an inlet 20 for receiving documents, an outlet 21 for discharging documents from a validation area of validator 2, a validation passageway 22a for guiding the document transported between inlet 20 and outlet 21, a validation conveyor 22 for transporting the document along validation passageway 22a, a stack motor 24 in validator 2 for driving a second gear train (a second power transmission) 69 (FIG. 5) drivingly connected to gears 64, 65 in a container 51, an inlet sensor 20a for detecting the document inserted or dispensed, and an outlet sensor 21a for detecting the document discharged from the validation area. Validation conveyor 22 includes a conveyor motor 23, a conveyor belt 22b driven by conveyor motor 23 for transporting the document along validation passageway 22a, a set of pulleys 22c with conveyor belt 22b wound therearound, and a set of idle rollers 22d in contact to conveyor belt 22b for transporting the document while diverting the direction of conveyor belt 22b. Conveyor motor 23 also serves to drive a main conveyor belt 40 through a first gear train (a first power transmission) 60 and a gear 26 (FIG. 4) to transport the document along a main passageway 6 in main conveyor 4. Provided along validation passageway 22a is a validation sensor 10 for detecting optical or magnetic features of the document. As illustrated in FIG. 4, rotation power of conveyor motor 23 is transmitted from a gear 23a secured on a drive shaft of conveyor motor 23 to first gear train 60. As illustrated in FIG. 5, rotation power of stack motor 24 is transmitted from a gear 24a secured on a drive shaft of stack motor 24 to second gear train 69.

Outlet 21 of validation area in validator 2 feeds into validation passageway 22a formed in validator 2 and also into main passageway 6 formed in main conveyor 4 disposed downstream of validator passageway 22a. As shown in FIG. 4, main conveyor 4 includes an outlet gear 26 drivingly connected to first gear train 60, a driven gear 42 meshed with outlet gear 26, a pulley 41 secured to driven gear 42, and main conveyor belt 40 wound around pulleys 41, 43, 44, 45. Main conveyor belt 40 is also wound around idle rollers 46, 47, 48 for applying tensional force to main conveyor belt 40.

Figure 2:
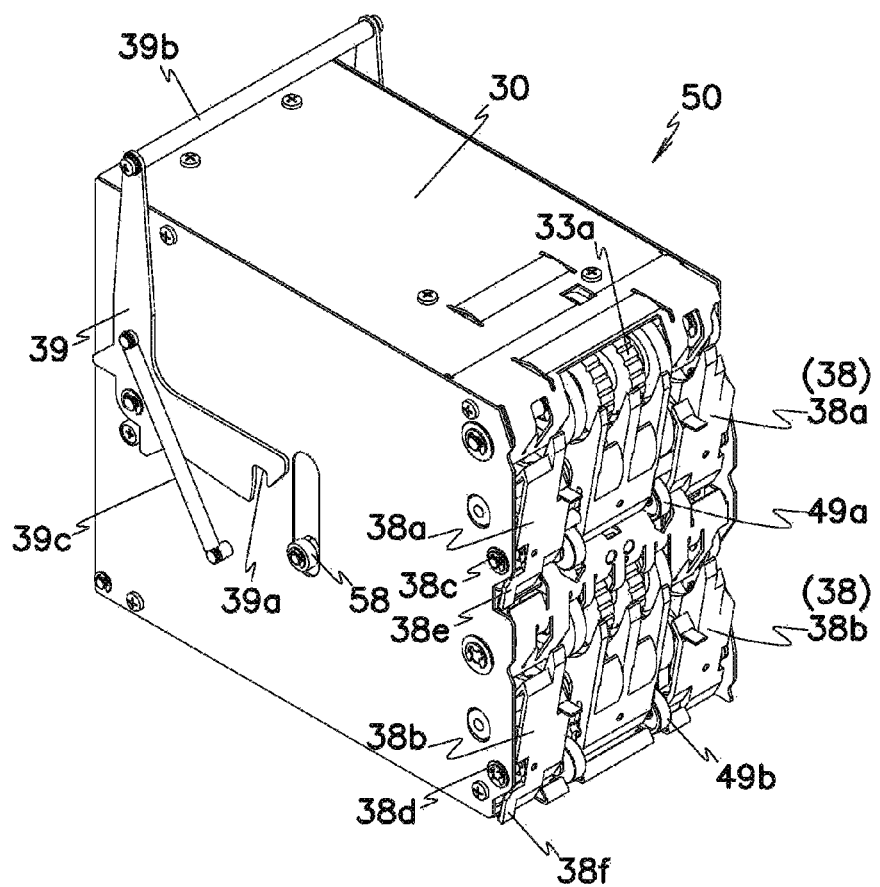
FIG. 2 is a perspective view of a storage that may be removably attached to the document handler shown in FIG. 1.
Figure 3:
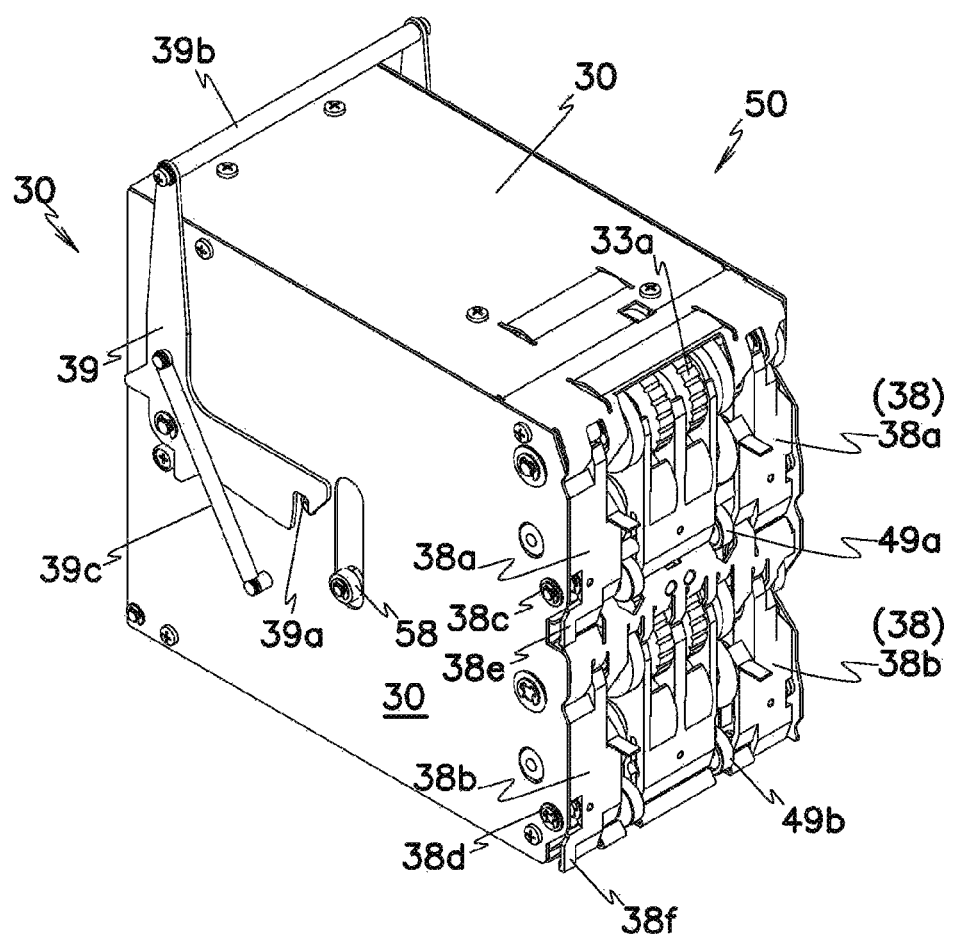
FIG. 3 is a perspective view of the storage shown in FIG. 2 with deflection levers in the closed position.

As shown in FIG. 2 and FIG. 3, stacker 3 includes a set of pinch rollers 49, 49a, 49b rotatably mounted in stacker 3 and releasably pressed against main conveyor belt 40 on the opposite side of mating idle rollers 46, 47, 48 when stacker 3 is attached to validator 2. The document exiting outlet 21 of validation passageway 22a is sent to main passageway 6 of main conveyor 4, and then, grasped between main conveyor belt 40 and pinch roller 49 to ensure transportation of the document along main passageway 6 toward storage 50 or container 51 of stacker 3 during movement of main conveyor belt 40.

Disposed vertically under and adjacent to upper and lower stackers 31 and 32 is container 51. Container 51 stores non-recyclable documents of a single type or of different types. For example, printed tickets to be held by an ECM may be deposited into container 51 since printed tickets will not be re-used or dispensed by document handler 1 once accepted. Further, if stackers 31 and 32 have reached maximum capacity so that no additional bills may be deposited into those stackers, additional bills may be directed to container 51.

As shown in FIG. 5, an end gear 61 is engaged with second gear train 69 in validator 2 and also interlocked with an upper gear 62 for power transmission. A drive belt 68 is wound around an upper pulley 66 secured to pulley gear 62 and also around a lower pulley 67 secured to a lower gear 65. Rotation of drive belt 68 causes lower pulley 67 and gear 65 to rotate to simultaneously further transmit the rotation force to a gear 63 meshed with lower gear 65 and a container gear 64 rotatably mounted in container 51. Container gear 64 works with a container pulley attached thereto (not shown in the drawings) and with a container belt wound around the container pulley to drive container pulley and belt through container gear 64 to deposit documents in container 51 sent via main conveyor 4. When a document is transported by main conveyor 4 shown in FIG. 1 toward container 51, it passes a passage sensor 203 that detects a leading edge of the transported document to produce a detection signal that is sent to a control device (a discrimination/conveyance controller) 200 that is one or more CPUs shown in FIG. 19, that then provides a drive signal for stack motor 24. Stack motor 24 is rotated to drive the belt (not shown) in container 51 and introduce the non-accessible document into container 51. After that, stack motor 24 is driven in the reverse direction to operate a stack mechanism (not shown) to store the non-accessible document in container 51.

By way of example, the embodiment may rotate reversible motors 70a, 70b in main conveyor 4 in a forward direction to drive storage conveyors 5 and place a document fed from validator 2 into storage 50, and to the contrary, it may rotate reversible motors 70a, 70b in the reverse direction to drive storage conveyors 5 and pick out documents received in upper and lower storage spaces 31a and 32a of upper and lower stackers 31, 32 to transport and dispense them through main passageway 6 from inlet 20 of validator 2.

Figure 6:
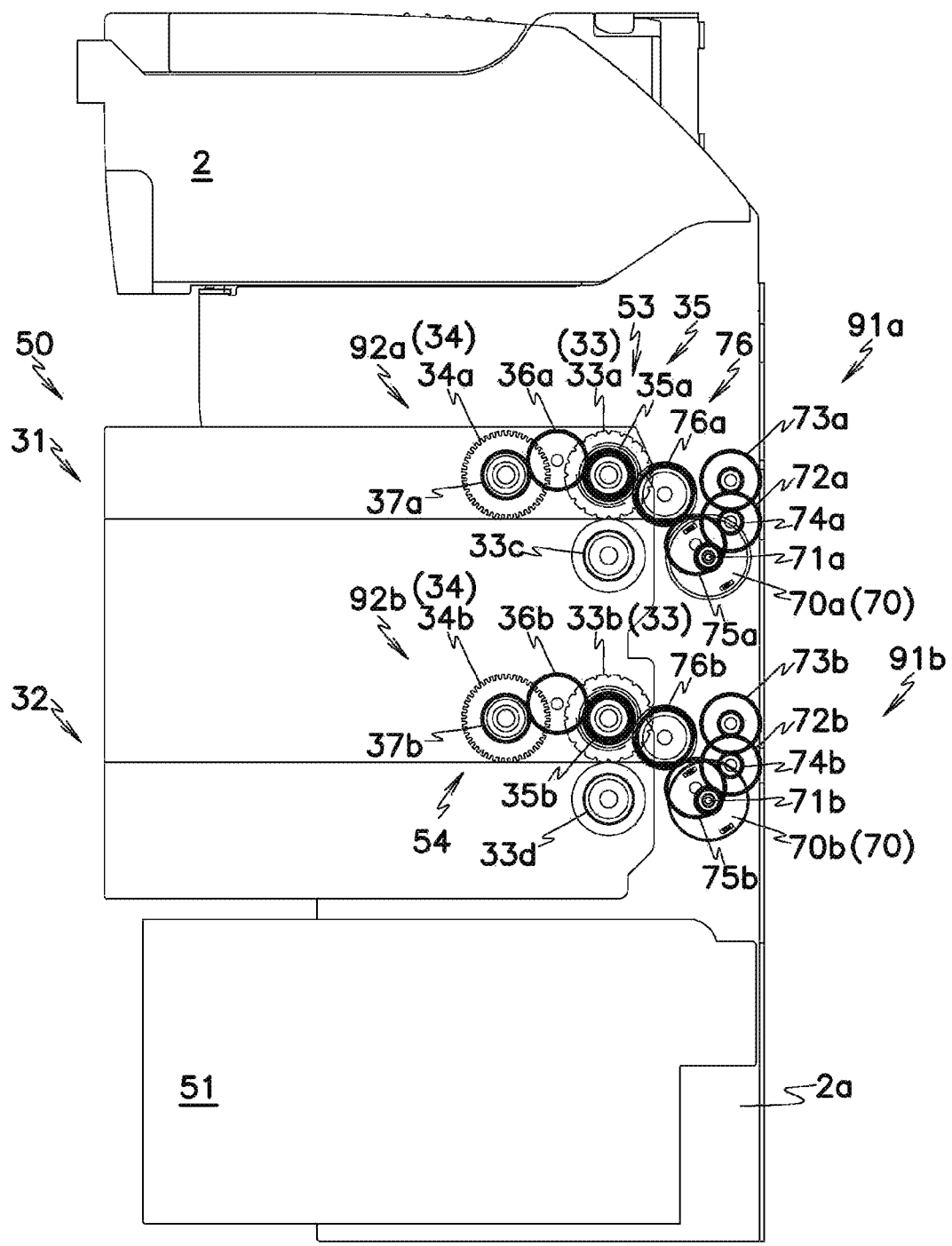
FIG. 6 is a sectional view showing a stack conveyor in the storage in separable driving connection to a reversible motor in the document handler.

In addition, as is apparent from FIG. 6, storage conveyor 5 comprises upper and lower (first and second) reversible conveyors 53 and 54. Upper reversible conveyor 53 includes a follower gear 35a detachably engaged with drive gear 76a driven by upper reversible motor 70a in main conveyor 4, and feed and delivery rollers 33a, 34b driven by follower gear 35a for transportation of documents into upper storage space 31a of upper stacker 31. Likewise, lower reversible conveyor 54 includes a follower gear 35b detachably engaged with a drive gear 76b driven by lower reversible motor 70b in main conveyor 4, and feed and delivery rollers 33b, 34b driven by follower gear 35b for transporting documents into lower storage space 32a of lower stacker 32. Reversible motors 70 (collectively referred to herein), feed and delivery rollers 33, 34, follower gears 35, drive gears 76 and pinch rollers 49 are respectively reversible motors 70a, 70b, feed and delivery rollers 33a, 33b, 34a, 34b, follower gears 35a, 35b, drive gears 76a, 76b and pinch rollers 49a, 49b. In this way, reversible motors 70 may work with or drive storage conveyors 5 drivingly connected to reversible motors 70, and storage conveyors 5 may be detached from reversible motors 70 when storage 50 is removed from validator 2. Accordingly, the weight of storage 50 may be reduced weight storage conveyors 5 dispense documents using their own power source.

In this configuration, storage conveyors 5 in stacker 3 are driven bidirectionally by reversible motors 70, to drive each storage conveyor 5 in the forward direction to store in upper or lower storage 31a or 32a of upper or lower stacker 31 or 32 documents fed from validator 2, and to drive each storage conveyor 5 in the reverse direction in order to extract documents from upper or lower storage 31a or 32a of upper or lower stacker 31 or 32 and send it by main conveyor 4 to validator 2 to be dispensed. When storage 50 is attached to validator 2, storage conveyors 5 in stacker 3 are automatically brought into driving connection to reversible motors 70 in main conveyor 4 to drive storage conveyors 5 systematically and organically or in conjunction with operation of main conveyor 4. Also, as storage 50 is detachably attached to frame 2a of validator 2, it may be separated from validator 2 to collect and count documents in upper and lower storage spaces 31a and 32a of upper and lower stackers 31 and 32. In addition, after storage 50 is removed from frame 2a of validator 2, an operator may access main conveyor 4 for maintenance, inspection and repair.

As shown in FIGS. 1 to 3, storage 50 includes a metallic or plastic casing 30 for making up an outer shell of storage 50 removably fit within frame 2a of validator 2, and upper and lower (first and second) stackers 31 and 32 respectively mounted vertically and immediately adjacent to each other at upper and lower portions in casing 30. For example, upper and lower stackers 31 and 32 may store documents of one or more denominations in to be extracted from their upper and lower storage spaces 31a and 32a.

As illustrated in FIGS. 6 to 9, storage 50 comprises upper and lower stackers 31 and 32 each of which has a storage conveyor 5 that includes feed rollers 33a, 33b for placing documents from main passageway 6 in upper and lower stackers 31, 32, delivery rollers 34a, 34b for extracting documents from upper and lower stackers 31, 32 to main passageway 6, support plates 57a, 57b for defining upper or lower storage 31a, 32a for stored documents, bottom plates 55a, 55b for supporting documents under support plates 57a, 57b, and pusher members 56a, 56b arranged above support plates 57a, 57b for stowing documents into upper or lower storage 31a, 32a when support plates 57a, 57b move upwards. In this description, bottom plates 55, support plates 57 and pusher members 56 respectively typically denote upper and lower bottom plates 55a, 55b, upper and lower support plates 57a, 57b and upper and lower pusher members 56a, 56b.

As shown in FIG. 1, upper and lower stackers 31, 32 have feed rollers 33a, 33b in contact with main conveyor belt 40 to grasp a transported document between feed rollers 33a, 33b and main conveyor belt 40. Reversible motors 70a, 70b are operated to simultaneously drive feed rollers 33a, 33b and delivery rollers 34a, 34b in upper and lower stackers 31, 32.

As shown in FIGS. 1 to 3, 7 and 8 and 16 to 18, upper and lower stackers 31, 32 each include upper and lower (first and second) deflection levers 38a and 38b each movable between their open and closed positions. Specifically, upper and lower deflection levers 38a and 38b are in the open position to guide a document supplied from validator 2 through main passageway 6 into upper and lower stackers 31, 32 and also to guide a document discharged from upper and lower stackers 31, 32 through main passageway 6 to validator 2. Alternatively, upper and lower deflection levers 38a and 38b are in the closed position to block passage of a document between upper or lower stacker 31, 32 and main passageway 6. While in the closed position, they are designed to neither project into main passageway 6 nor to block a document from being stowed into the open stacker or container 51, or a document from being extracted from the open stacker. Upper and lower deflection levers 38a and 38b are herein collectively referred to as deflection levers 38. Upper and lower deflection levers 38a and 38b are pivoted respectively around upper and lower shafts 38c and 38d for rotation between the open and closed positions.

Figure 7:
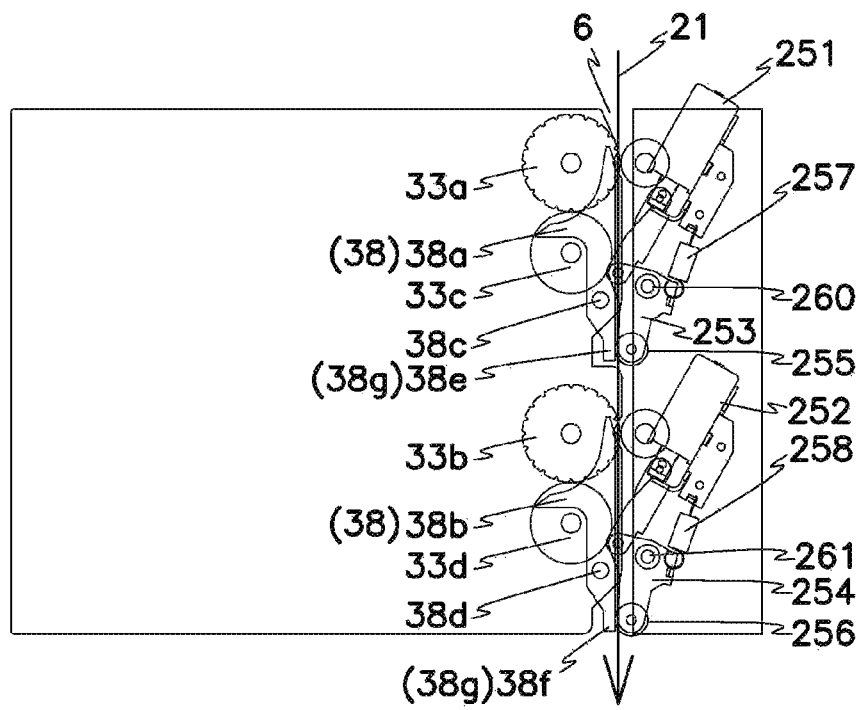
FIG. 7 is a sectional view showing deflection levers in the closed position for blocking communication between the storage and a main passageway.
Figure 8:
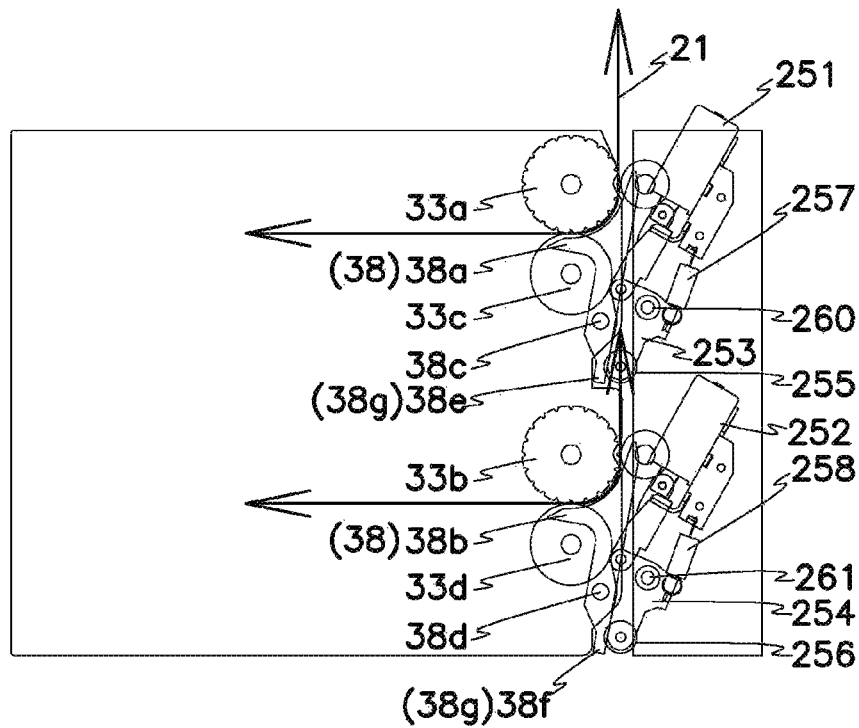
FIG. 8 is a sectional view showing deflector levers in the open position for allowing communication between the storage and the main passageway.

FIGS. 7 and 8 illustrate main conveyor 4 that includes an upper solenoid (a first actuator) 251 for shifting upper deflection lever 38a between the open and closed positions through an upper intermediate lever 253 (FIG. 7) rotatably mounted around a shaft 260 attached to main conveyor 4, a lower solenoid (a second actuator) 252 for shifting lower deflection lever 38b between the open and closed positions through a lower intermediate lever 254 rotatably mounted around a shaft 261 attached to main conveyor 4, an upper spring 257 for resiliently urging upper intermediate lever 253 toward an inoperative position to elastically push upper deflection lever 38a toward the closed position, and a lower spring 258 for resiliently urging lower intermediate lever 254 toward an inoperative position to elastically push lower deflection lever 38b toward the closed position. Attached at the bottom end of upper intermediate lever 253 is an upper lever roller 255 in contact to upper deflection lever 38a, and also, attached at the bottom end of lower intermediate lever 254 is a lower lever roller 256 in contact to lower deflection lever 38b. Collectively referred herein to as solenoids 261, intermediate levers 262, springs 263 and lever rollers 264 are respectively upper and lower solenoids 251 and 252, upper and lower intermediate levers 253 and 254, upper and lower springs 257 and 258 and upper and lower lever rollers 255 and 256.

When upper solenoid 251 is activated, upper intermediate lever 253 is rotated in the clockwise direction around shaft 260 against resilient force of upper spring 257, and simultaneously upper lever roller 255 pushes upper lever end 38e into upper storage space 31a of upper stacker 31. This causes upper deflection lever 38a to rotate around upper shaft 38c in the clockwise direction from the closed position shown in FIG. 7 to the open position shown in FIGS. 1 and 8 so that a tip of upper deflection lever 38a comes into main passageway 6. In a reverse direction, when upper solenoid 251 is deactivated, upper intermediate lever 253 is rotated in the counterclockwise direction around shaft 260 by virtue of elastic force of upper spring 257 to separate upper lever roller 255 from upper lever end 38e; then, upper deflection lever 38a is rotated in the counterclockwise direction by an elastic force of a spring not shown from the open to the closed position, and the tip of upper deflection lever 38a is retracted out of main passageway 6 (FIG. 7).

In a similar manner, when lower solenoid 252 is activated, lower intermediate lever 254 is rotated around shaft 261 in the clockwise direction against elastic force of lower spring 258 so that lower lever roller 256 pushes lower lever end 38f into lower storage space 32a of lower stacker 32. This causes lower deflection lever 38b to rotate around upper shaft 38c in the clockwise direction from the closed to the open position so that a tip of lower deflection lever 38b comes into main passageway 6 (FIGS. 1 and 8). And in reverse, when lower solenoid 252 is deactivated, intermediate lever 254 is rotated in the counterclockwise direction around shaft 261 by virtue of elastic force of lower spring 258 to separate upper lever roller 255 from upper lever end 38e; then, lower deflection lever 38b is rotated in the counterclockwise direction by an elastic force of a spring not shown from the open to the closed position; and the tip of lower deflection lever 38b is retracted out of main passageway 6 (FIG. 7). In this way, upper and lower deflection levers 38a and 38b may be independently rotated between the closed and open positions by respective operation of upper and lower solenoids 251 and 252. This arrangement may establish simple contacts between upper lever end 38e of upper deflection lever 38a and upper lever roller 255 and also between lower lever end 38f of lower deflection lever 38b and lower lever roller 256 to allow upper and lower deflection levers 38a and 38b to be separated from upper and lower solenoids 251 and 252, respectively, when storage 50 is removed from validator 2. Upper and lower deflection levers 38a and 38b are used to guide and extract documents into or out of upper and lower storage spaces 31a and 32a, respectively, of upper and lower stackers 31 and 32. Collectively referred to herein as lever ends 38g are upper and lower lever ends 38e and 38f.

FIG. 6 shows main conveyor 4 that includes a first gear train 91a having an upper pinion 71a mounted on an output shaft of an upper conveyor motor 70a in upper stacker 31, an upper first gear 72a meshed with upper pinion 71a, an upper second gear 74a secured to upper first gear 72a for their integral rotation, an upper third gear 75a meshed with upper second gear 74a, and an upper fourth gear 76a meshed with upper third gear 75a. Main conveyor 4 also has a second gear train 91b that similarly includes a lower pinion 71b mounted on an output shaft of a lower conveyor motor 70b in lower stacker 32, a lower first gear 72b meshed with lower pinion 71b, a lower second gear 74b secured to lower first gear 72b for integral rotation, a lower third gear 75b meshed with lower second gear 74b, and a lower fourth gear 76b meshed with lower third gear 75b.

Upper stacker 31 has a first driven gear train 92a that includes an upper follower gear 35a detachably meshed with an upper drive gear 76a, an upper fourth gear 36a meshed with upper follower gear 35a, and an upper fifth gear 37a meshed with upper fourth gear 36a. Upper feed roller 33a and delivery roller 34a are integrally formed with upper intermediate and fifth gears 35a and 37a, respectively. Likewise, lower stacker 32 has a second driven gear train 92b that includes a lower follower gear 35b detachably meshed with a lower drive gear 76b, a lower fourth gear 36b meshed with lower follower gear 35b, and a lower fifth gear 37b meshed with lower fourth gear 36b. Lower feed and delivery rollers 33b and 34b are integrally formed with lower intermediate and fifth gears 35b and 37b, respectively.

Figure 9:
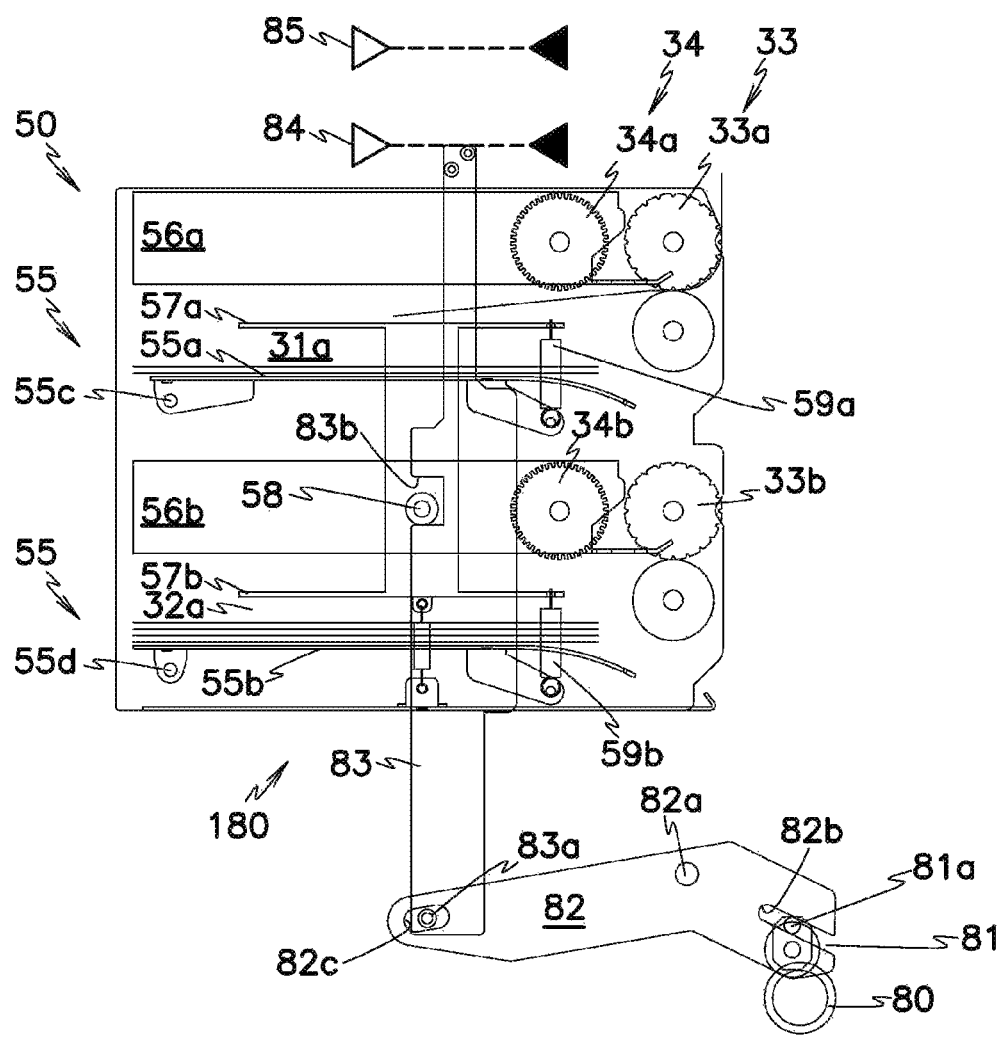
FIG. 9 is a partial and longitudinal sectional view of the storage taken along a plane transverse or perpendicular to a paper plane of FIG. 10.
Figure 10:
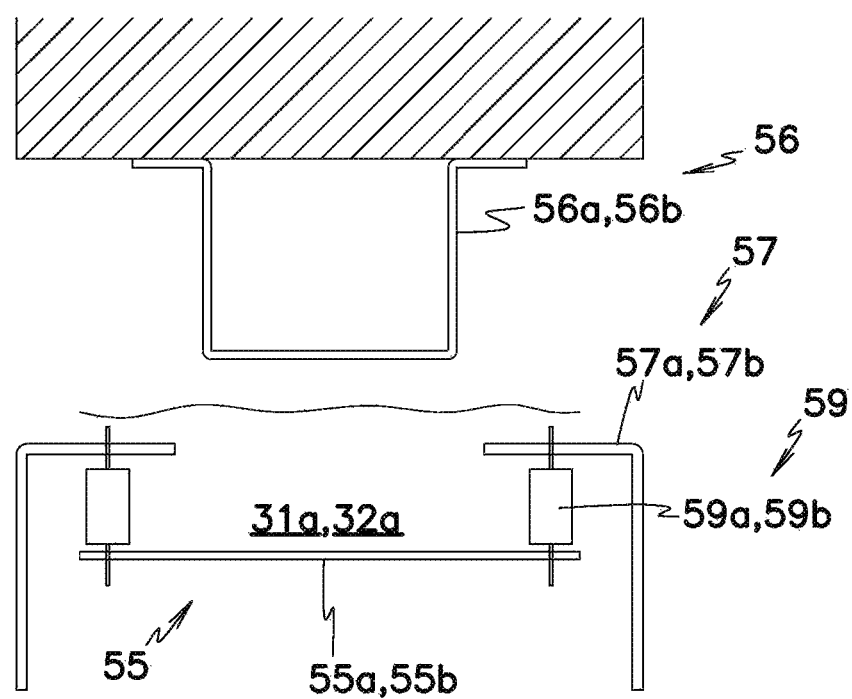
FIG. 10 is a partial sectional view of the storage showing a condition just before stowing a document into the storage where the document supplied from the validator is supported on a support plate of the storage.
Figure 11:
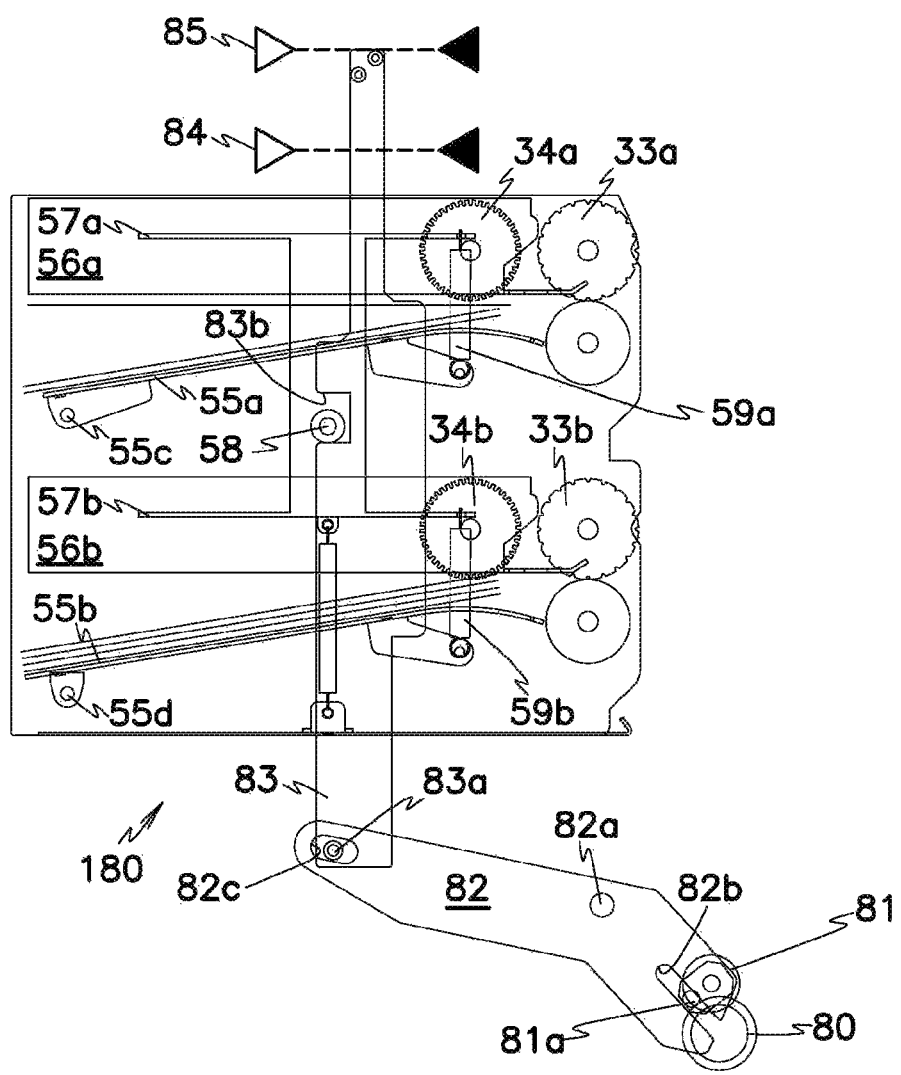
FIG. 11 is a sectional view showing the document stowed in the storage by a pusher plate.

FIGS. 9 and 11 depict a lifter 180 attached to a side wall of a frame 2a in validator 2 for vertically moving support plates 57a and 57b in stackers 31, 32 of storage 50 between lowered and elevated positions in accordance with a vertical movement of a rod 83 in lifter 180. As shown in FIG. 9, lifter 180 includes a lifter motor 80 attached to validator 2, a rotary disk 81 rotated by lifter motor 80, a pin 81a attached at an eccentric position away from a central axis on rotary disk 81, a lift lever 82 rotatable around a shaft 82a and formed with a notch 82b for receiving pin 81a, a pin 83a formed with rod 83 and received within an elongated hole 82c bored at an end of lift lever 82, upper and lower support plates 57a and 57b integrally formed into a generally upset H-shape in storage 50, a roller 58 formed on support plates 57a and 57b and received within a cutout 83b of rod 83, upper (first) and lower (second) bottom plates 55a and 55b each rotatable around shafts 55c, 55d within upper and lower stackers 31 and 32, and upper and lower pusher members 56a and 56b secured to casing 30 above related upper and lower support plates 57a and 57b each connected to upper and lower bottom plates 55a and 55b through springs 59a and 59b.

Figure 12:
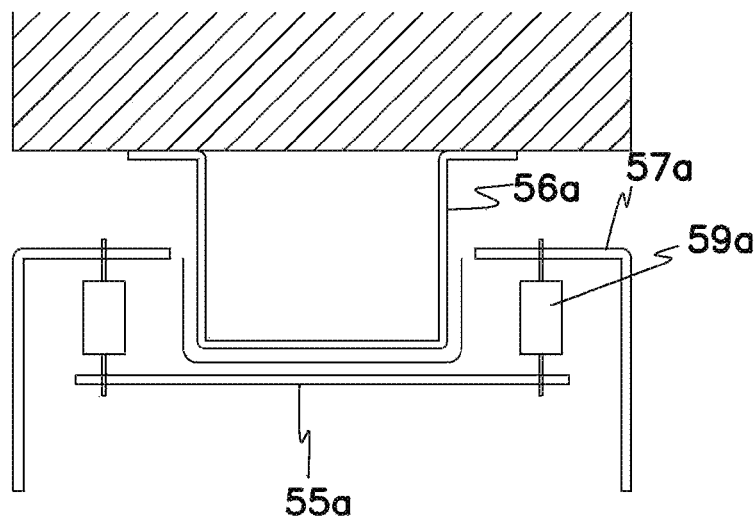
FIG. 12 is a partial sectional view taken along a plane transverse or perpendicular to a paper plane of FIG. 11.
Figure 13:
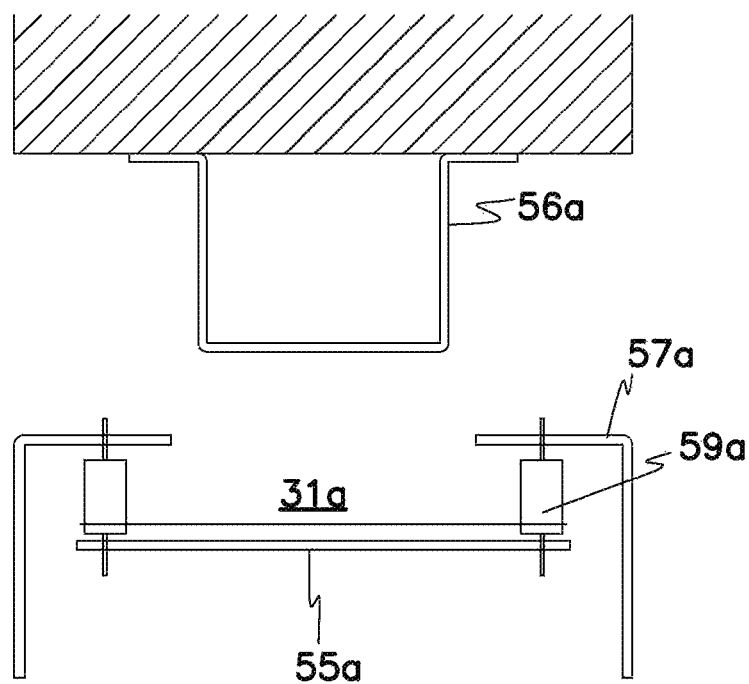
FIG. 13 is a partial sectional view showing the document completely stowed into the storage.
Figure 14:
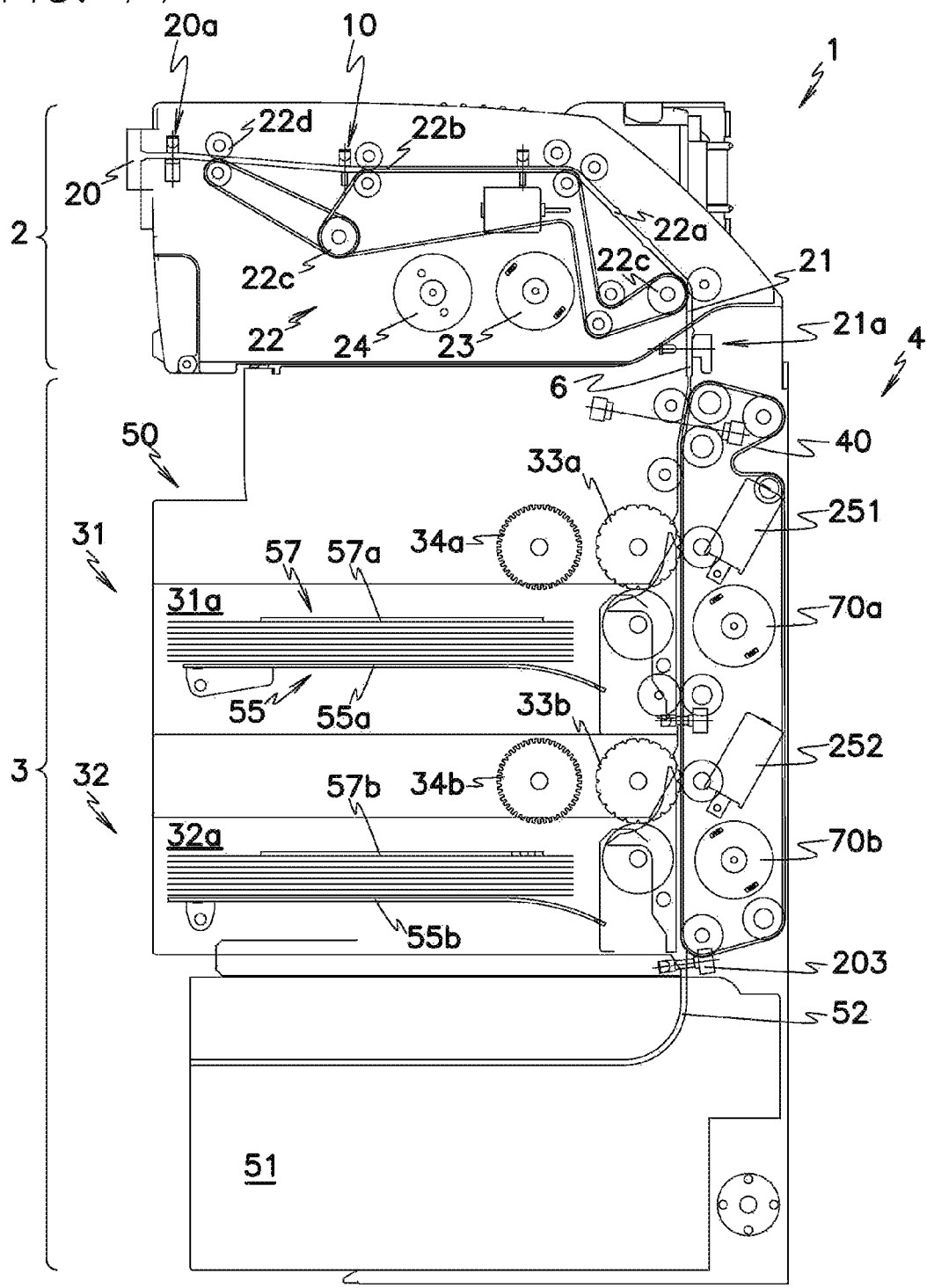
FIG. 14 is a sectional view showing documents introduced into the storage from the document validator.
Figure 15:
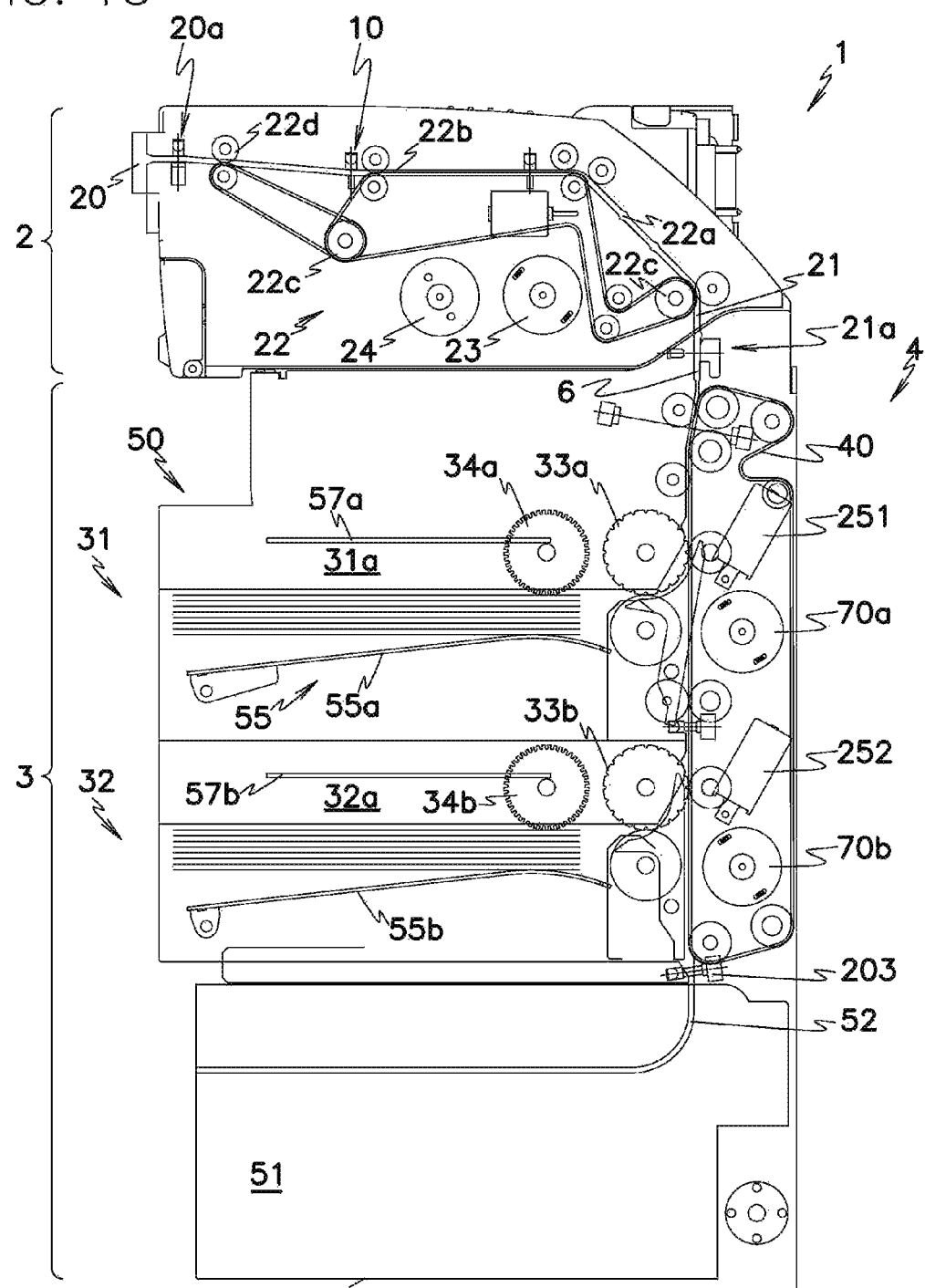
FIG. 15 is a sectional view showing bills on a bottom plate in the elevated position to discharge and transport a document from the storage toward the document validator.

When lift motor 80 is rotated in the forward direction, lift lever 82 is rotated in the clockwise direction around shaft 82a through rotary disk 81 to elevate rod 83. This causes support plates 57 to travel from the lower position shown in FIG. 9 toward stationary pusher members 56a, 56b to the upper position shown in FIG. 11 along with rod 83 while springs 59a, 59b are expanded against their resilient force with the rise of rod 83 and support plates 57 to the upper position. Then, when a document has been fully fed from feed rollers 33a, 33b onto support plates 57a, 57b, they are elevated together with rod 83, and then, as illustrated in FIG. 12, pusher members 56a, 56b push and stow the document into support plates 57a, 57b onto bottom plates 55a, 55b against resilient force of springs 59a, 59b. After that, when lift motor 80 further rotates in the forward direction, lift lever 82 rotates in the counterclockwise direction to lower rod 82 and support plates 57a, 57b in unison. As shown in FIG. 13, springs 59a, 59b are contracted by their own elasticity while both sides of the document are laid on bottom plates 55a, 55b Now, stacking operations of documents will be described with reference to the operational sequence of flow chart shown in FIG. 17. Processing moves on from START in Step 100 to 101 where control device 200 decides on whether or not inlet sensor 20a is turned on by insertion of a document into inlet 20. When control device 200 receives a detection signal from inlet sensor 20a upon a document insertion event, it causes conveyor motor 23 to rotate in the forward direction (in Step 102). The document is transported along validation passageway 22a by validation conveyor 22, and validation sensor 10 converts optical or magnetic features of the moving document into detection signals transmitted to control device 200. Detection signals are received by control device 200 from validation sensor 10 to [sic] and a decision is made at Step 103 on whether the document is genuine or not. This determination may be either to validate currency that is inserted into document handler 1, or in the alternative, to determine whether an inserted ticket is valid. In the case of currency, validation sensor 10 scans bill or ticket features including but not limited to optical and/or metallic features to determine whether it is authentic. For a printed ticket, a code on the ticket is read and document handler 1 communicates with a connected system (see FIG. 23) to confirm that the detected code is authentic.

If the document in the form of a bill or a ticket is determined to be genuine, control device 200 then determines the denomination of the document if it is a bill (in Step 104). As documents that are bills of different denominations are stacked in upper and lower storage spaces 31a and 32a of upper and lower stackers 31 and 32, control device 200 selectively activates related upper or lower solenoid 251 or 252 (in Step 105) to selectively rotate upper or lower deflection lever 38a or 38b from the closed to the open position. Then, control device 200 rotates selectively upper or lower reversible motor 70a or 70b related to the selected denomination (in Step 106). Next, control device 200 receives a detection signal from passage sensor 21a to confirm that the document has passed through passage sensor 21a (in Step 107), and further it determines (in Step 108) on whether a given period of time has elapsed after passage of the document through passage sensor 21a. Thus, the document, in this case a bill runs along upper or lower deflection lever 38a or 38b related to the bill denomination into upper or lower stacker 31 or 32 onto support plate 57a or 57b, and so, control device 200 turns off driven upper or lower solenoid 251 or 252 to rotate upper or lower deflection lever 38a or 38b from the open to the closed position (in Step 109) by elastic force of spring not shown, and also control device 200 stops operation of driven upper or lower reversible motor 70a or 70b (in Step 110).

After that, control device 200 activates lifter motor 80 (in Step 111) to move rod 83 from the lower position of FIG. 9 to the upper position of FIG. 11. In Step 112, when a first lifter sensor 84 detects elevated rod 83, it is turned on to produce a detection signal that is transmitted to control device 200. When upper and lower support plates 57a, 57b are in the lower position of FIG. 10, control device 200 detects turning-on of first lifter sensor 84 in Step 112, while one of upper and lower support plates 57a, 57b supports the bill that is fed. When upper and lower support plates 57a, 57b are upwardly moved from the lower position to the upper position of FIG. 12, upper or lower pusher member 56a or 56b forcibly stows the bill on upper or lower support plate 57a, 57b onto upper or lower bottom plate 55a or 55b within upper or lower stacker 31 or 32, and control device 200 detects turning-on of a second lifter sensor 85 in Step 113. Processing moves on from Step 113 to 114 where control device 200 further activates lifter motor 80 to lower rod 83, and when first lifter sensor 84 detects rod 83 in the lower position, control device 200 ceases operation of lifter motor 80 to finish the stowing operation of the bill as side edges of the bill are also in contact to bottom plate 55 as shown in FIG. 13.

When control device 200 determines that the bill is not genuine in Step 103, processing goes on from Step 130 to 116 where control device 200 drives conveyor motor 23 in the reverse direction to return the bill to inlet 20. The bill returned to inlet 20 turns on inlet sensor 20a (in Step 117) so that control device 200 stops operation of conveyor motor 23 (in Step 118). Subsequently, when an operator takes out the bill from inlet 20 (in Step 119), the process for returning the bill is complete.

Figure 16:
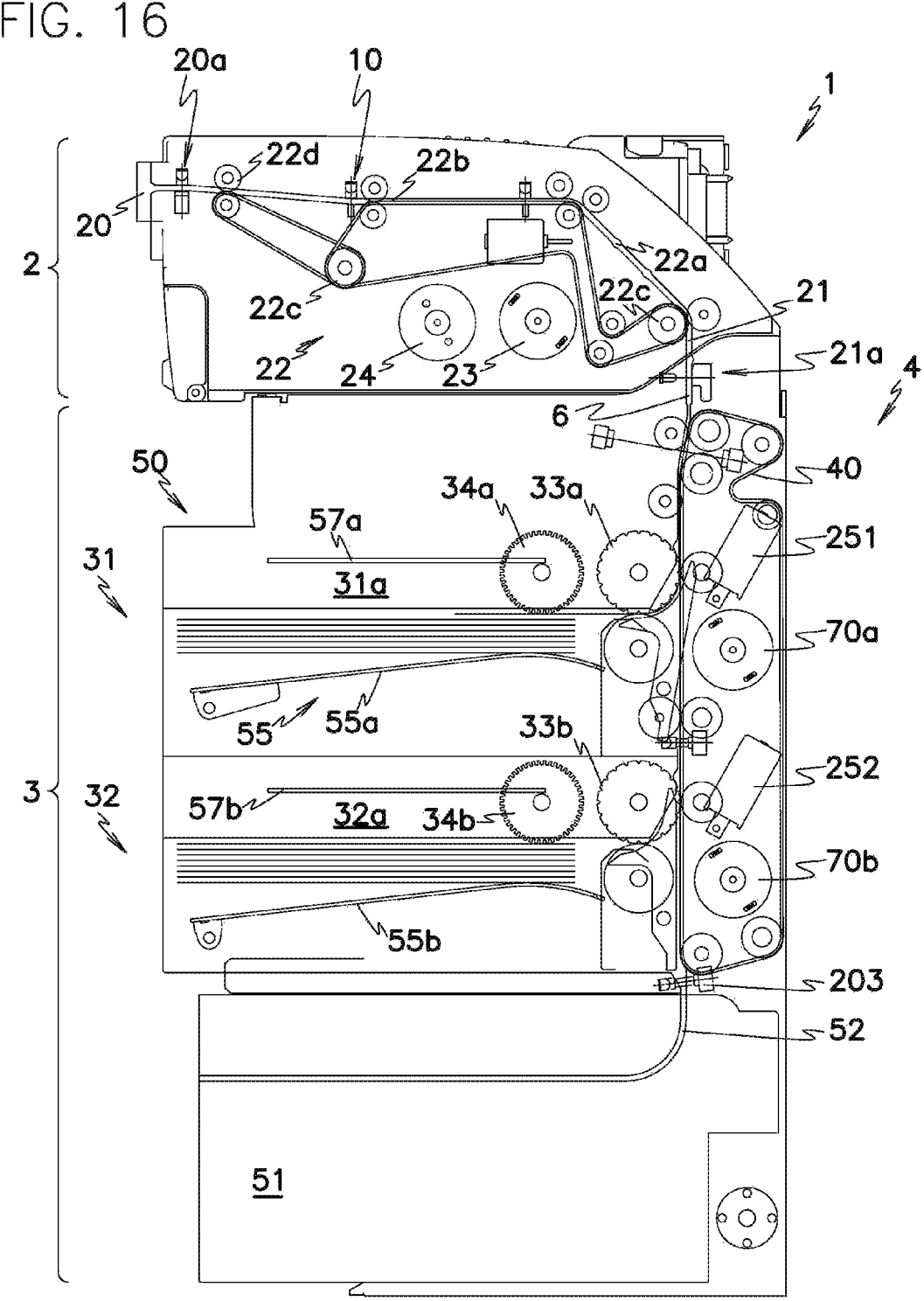
FIG. 16 is a sectional view showing delivery and feed rollers rotated to pick out a document from the storage toward the document validator.
Figure 17:
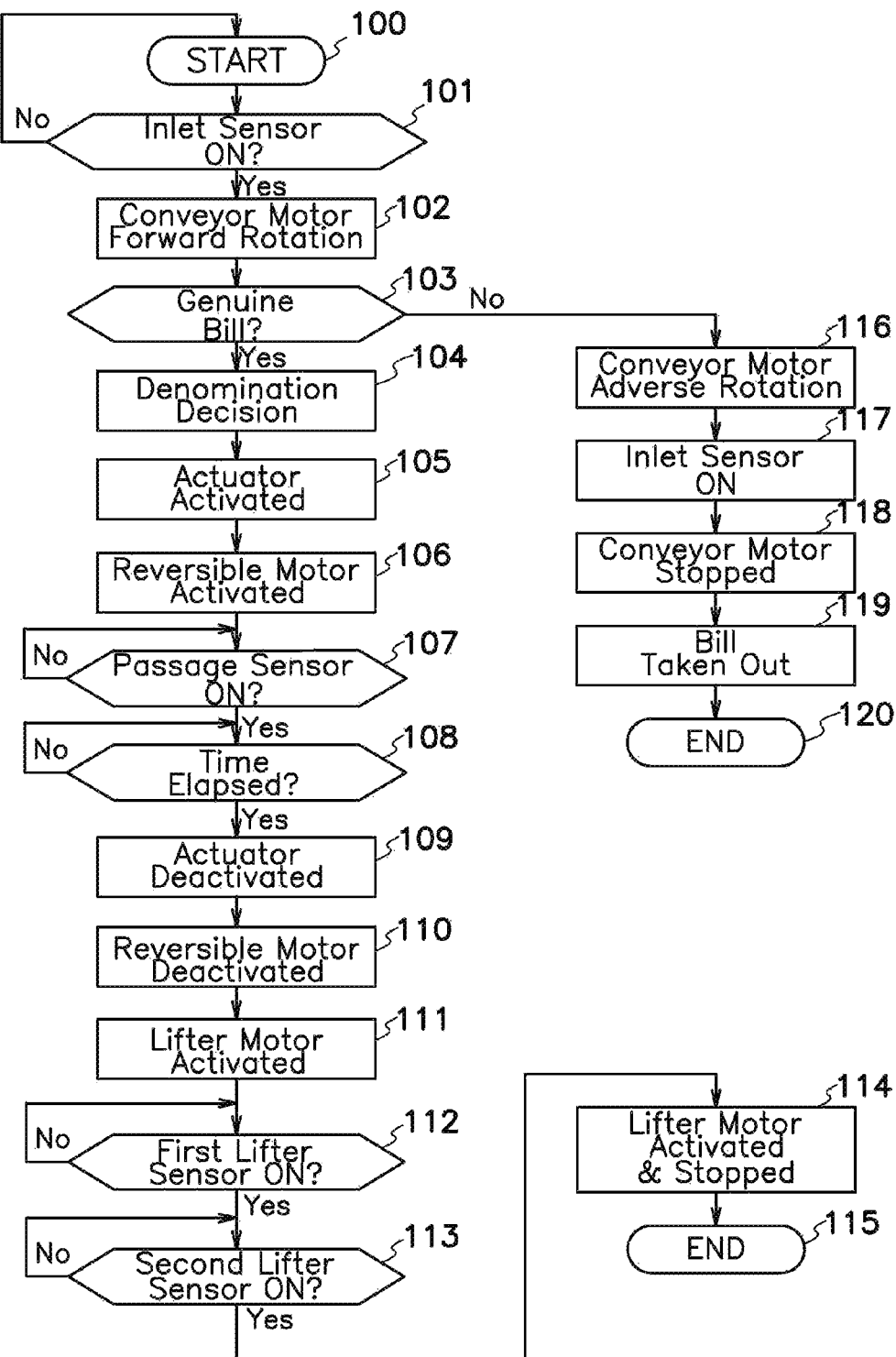
FIG. 17 is a flow chart showing an operational sequence for stowing a document into the storage.
Figure 18:
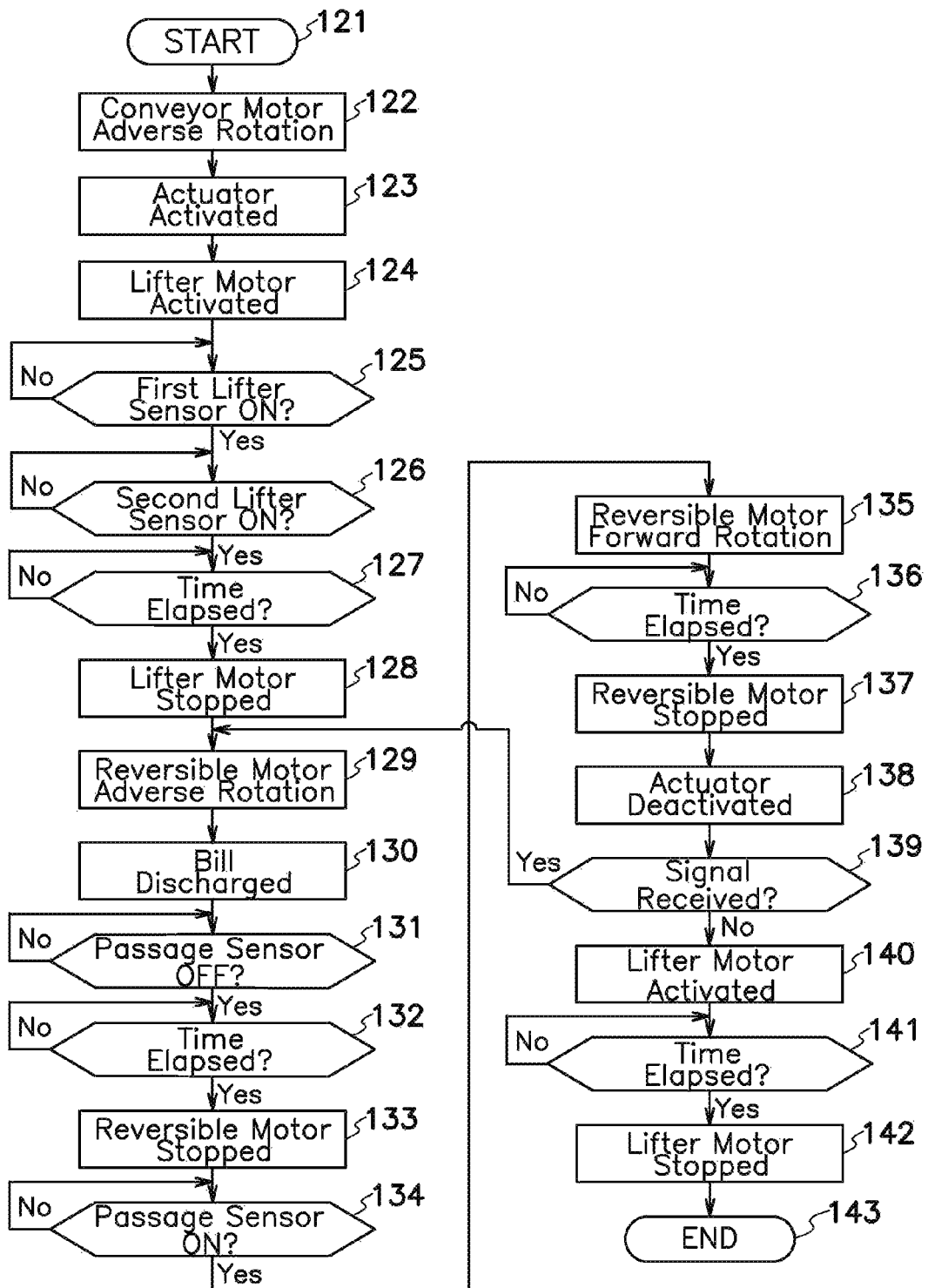
FIG. 18 is a flow chart showing an operational sequence for discharging a document from the storage.

Now, the payment operation of documents will be described with reference to the operational sequence of flow chart shown in FIG. 18. From Step 121 of START to 122, when control device 200 receives an instruction signal to prepare for bill payment, it drives conveyor motor 23 in the reverse direction and at the same time turns on upper or lower solenoid 251 or 252 related to upper or lower stacker 31 or 32 that stores documents, which in this case are bills of the denomination to be dispensed (in Step 123) to rotate upper or lower deflection lever 38a or 38b from the closed to the open position. Lifter motor 80 is then rotated in the forward direction (in Step 124), rod 83 is moved upward to sequentially turn on first and second lifter sensors 84 and 85 in Steps 126 and 127. Subsequently, when a given period of time has elapsed after second lifter sensor 85 is turned on, control device 200 stops operation of lifter motor 80 (in Step 128) to maintain rod 83 in the elevated position of FIG. 11 so that upper and lower bottom plates 55a, 55b are retained in the slant condition shown in FIG. 15. This causes each uppermost one of the documents stored in upper and lower storage spaces 31a and 32a to be in contact to feed rollers 33a, 33b to finish preparation for the document to be dispensed. Then, as shown in FIG. 16, delivery rollers 34a, 34b and feed rollers 33a, 33b are rotated to discharge the uppermost bill from upper or lower storage spaces 31a or 32a to main passageway 6.

As mentioned before, deflection lever 38 is already in the open position, and conveyor motor 23 is rotated in the reverse direction. Here, when related upper or lower reversible motor 70a or 70b is rotated in the reverse direction in Step 129, the bill of the denomination is smoothly discharged from upper or lower storage 31a or 32a (in Step 130). Then, in Step 131, passage sensor 21a detects whether or not the discharged bill has passed passage sensor 21a, and when passage sensor 21a is turned off during passage of the bill, it forwards the off-detection signal to control device 200 that then determines whether or not a given period of time has elapsed after passage of the bill through passage sensor 21a (in Step 132), and when the given period of time has elapsed, control device 200 stops drive upper or lower reversible motor 70a or 70b (in Step 133).

Subsequently, control device 200 determines whether it receives from passage sensor 21a an ON detection signal indicative of complete passage of the document in Step 134. When passage sensor 21a detects passage of the document's trailing edge, processing moves on to Step 135 where control device 200 again rotates upper or lower reversible motor 70a or 70b in the forward rotation to prevent successive discharge from upper or lower storage 31a, 32a of a subsequent document just beneath the discharged document. After a certain period of time since upper or lower reversible motor 70a or 70b has been rotated in the forward direction, the process moves from Step 136 to 137 where control device 200 stops operation of related upper or lower reversible motor 70a or 70b, and turns off related solenoid 251 or 252 in Step 138 to advance to Step 139. Control device 200 determines in Step 139 whether or not to receive another instruction signal for payment, and when control device 200 receives the further instruction signal on payment, the process moves to Step 129. However, when it does not receive a further instruction signal, control device 200 rotates lifter motor 80 in the forward rotation (in Step 140) to return rod 83 to the lower position shown in FIG. 9, and then, control device 200 determines in Step 141 whether or not a certain period of time has elapsed after turning off first and second lifter sensors 84 and 85. After the certain period of time, control device 200 ceases operation of lifter motor 80 to finish the payment operation.

To remove storage 50 of stacker 3 from validator 2, it is pulled forward of validator 2 so that follower gears 35a, 35b in storage 50 are disengaged from drive gears 76a, 76b in main conveyor 4, while simultaneously, feed rollers 33a, 33b and pinch rollers 49a, 49b in storage 50 are released from main conveyor belt 40 in main conveyor 4.

As shown in FIGS. 2 and 4, stacker 3 includes a lever 39 rotatably mounted on a side wall 3a of casing 30, and a cutout 39a formed in lever 39 to releaseably hook cutout 39a on a pin 90 attached to frame 2a of validator 2 to secure storage 50 to frame 2a. When a handle 39b connected to lever 39 is pulled down while rotating lever 39, cutout 39a is released from pin 90 to detach storage 50 from frame 2a.

Conversely, to attach storage 50 to validator 2, it is pushed into validator 2 so that upper and lower follower gears 35a, 35b in upper and lower reversible conveyors 53 and 54 are automatically brought into engagement with drive gears 76a, 76b in main conveyor 4, and concurrently, feed rollers 33a, 33b and pinch rollers 49a, 49b in upper and lower reversible conveyors 53 and 54 are automatically brought into contact to main conveyor belt 40 in main conveyor 4. Thus, first and second reversible conveyors 53 and 54 in first and second stackers 31 and 32 are removably and drivingly connected to upper and lower reversible motors 70a and 70b in main conveyor 4.

Figure 20:
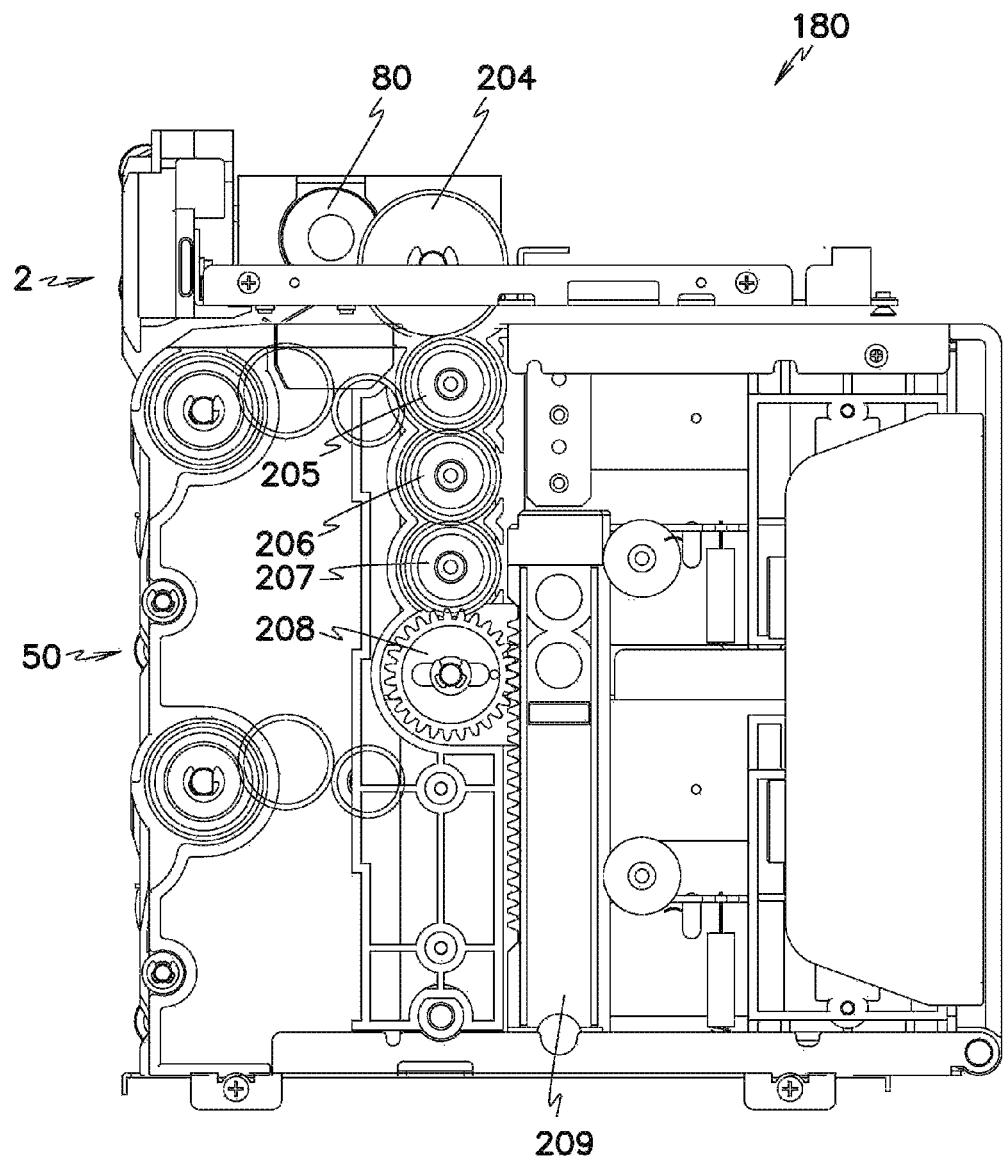
FIG. 20 is a sectional view illustrating an another embodiment of a lifter shown in FIG. 9.
Figure 21:
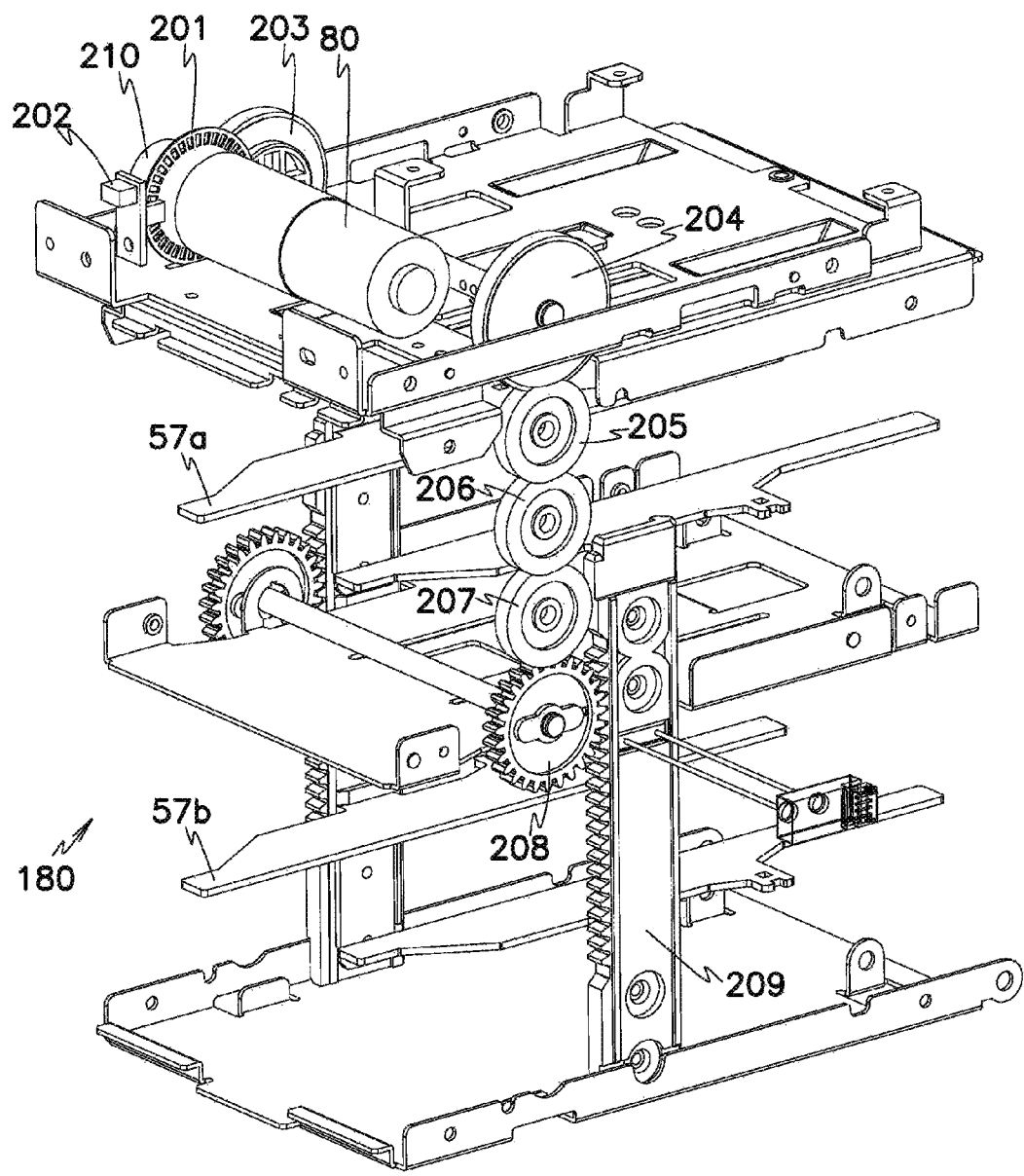
FIG. 21 is a perspective view illustrating an interior of the lifter in FIG. 20.
Figure 22:
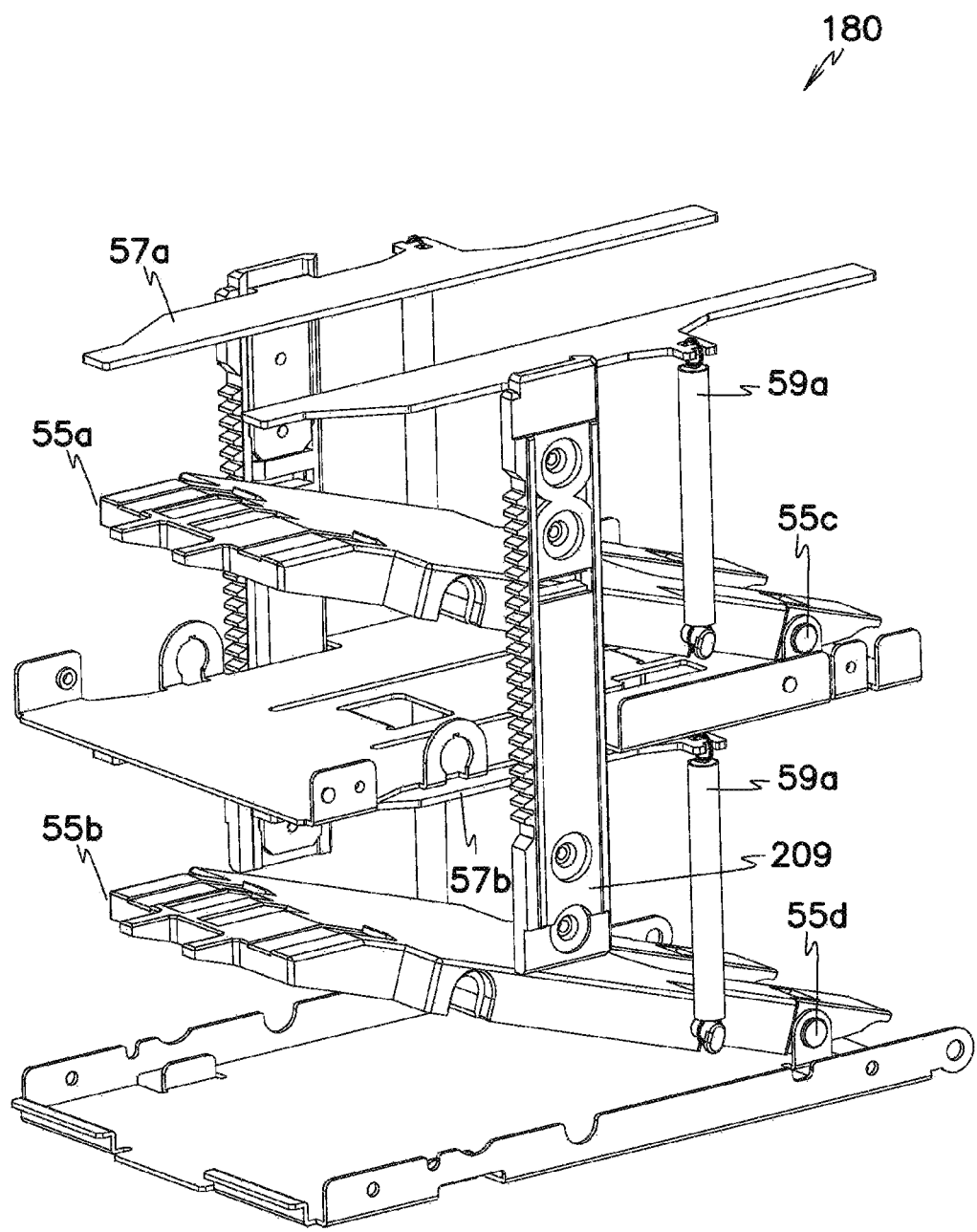
FIG. 22 is a perspective view illustrating a slanted bottom plate by operation of the lifter shown in FIG. 20.

FIGS. 20 to 22 depict another embodiment of lifter 180 having a different structure from that shown in FIG. 9. Lifter 180 includes a lifter motor 80 attached to validator 2, a drive gear 210 mounted on an output shaft of lifter motor 80, a rotary encoder 201 integrally rotated with drive gear 210, an encoder sensor 202 for generating electric pulses during rotation of rotary encoder 201, a first follower gear 203 meshed with drive gear 210, a second follower gear 204 mounted at the opposite end on the same shaft of first follower gear 203 for integral rotation, first, second and third intermediate gears 205, 206 and 207 interlocking second follower gear 204 in series, a lifter pinion 208 meshed with a third intermediate gear 207, and a rack gear 209 meshed with lifter pinion 208 and vertically movable during rotation of lifter pinion 208. First intermediate gear 205 is releaseably meshed with second follower gear 204 so that first intermediate gear 205 is automatically drivingly engaged with or disengaged from second follower 204 when storage 50 is attached to or removed from validator 2. In a similar manner to movement of upper and lower support plates 57a, 57b shown in FIG. 9, upper and lower support plates 57a, 57b may move between the lower position shown in FIG. 21 and the upper position shown in FIG. 22 to stow or discharge bills on upper or lower support plate 57a or 57b. In synchronization with upward and downward movement of upper and lower support plates 57a, 57b, upper and lower bottom plates 55a and 55b may be rotated between the horizontal and tilted conditions so that each uppermost document stored in upper and lower stackers 31, 32 is in contact to corresponding feed rollers 33 when upper and lower bottom plates 55a, 55b are in the tilted condition at the ready for discharge of documents from upper and lower stackers 31, 32. Then, as shown in FIG. 16, simultaneous reverse rotations of upper and lower feed and delivery rollers 33a, 33b, 34a and 34b cause documents to be discharged from upper and lower stackers 31 and 32 to main passageway 6. Control device 200 may receive and count pulses from rotary encoder 201 so that control device 200 may stop operation of lifter motor 80 at the desired number of pulses to stop upper and lower support plates 57a, 57b at the desired position or may drive lifter motor 80 in the forward or reverse direction to move upper and lower support plates 57a, 57b in the upward or downward directions.

The foregoing embodiments exemplify the conveyance structure for carrying documents along main passageway 6 by means of main conveyor belt 40. However, in lieu of or in addition to main conveyor belt 40, the embodiment may use combined main conveyor rollers and feed rollers and/or pinch rollers to carry bills along main passageway 6.

It should be understood that the details of a document handler 1 shown and described with respect to FIGS. 1-22 are exemplary of configurations of particular embodiments of a document handler. However, document handlers may be otherwise configured for purposes of working with the document handler system and method with timed operation of the present invention. The details of a system of this type and a method of operation will now be described with respect to FIGS. 23-26.

Figure 23:
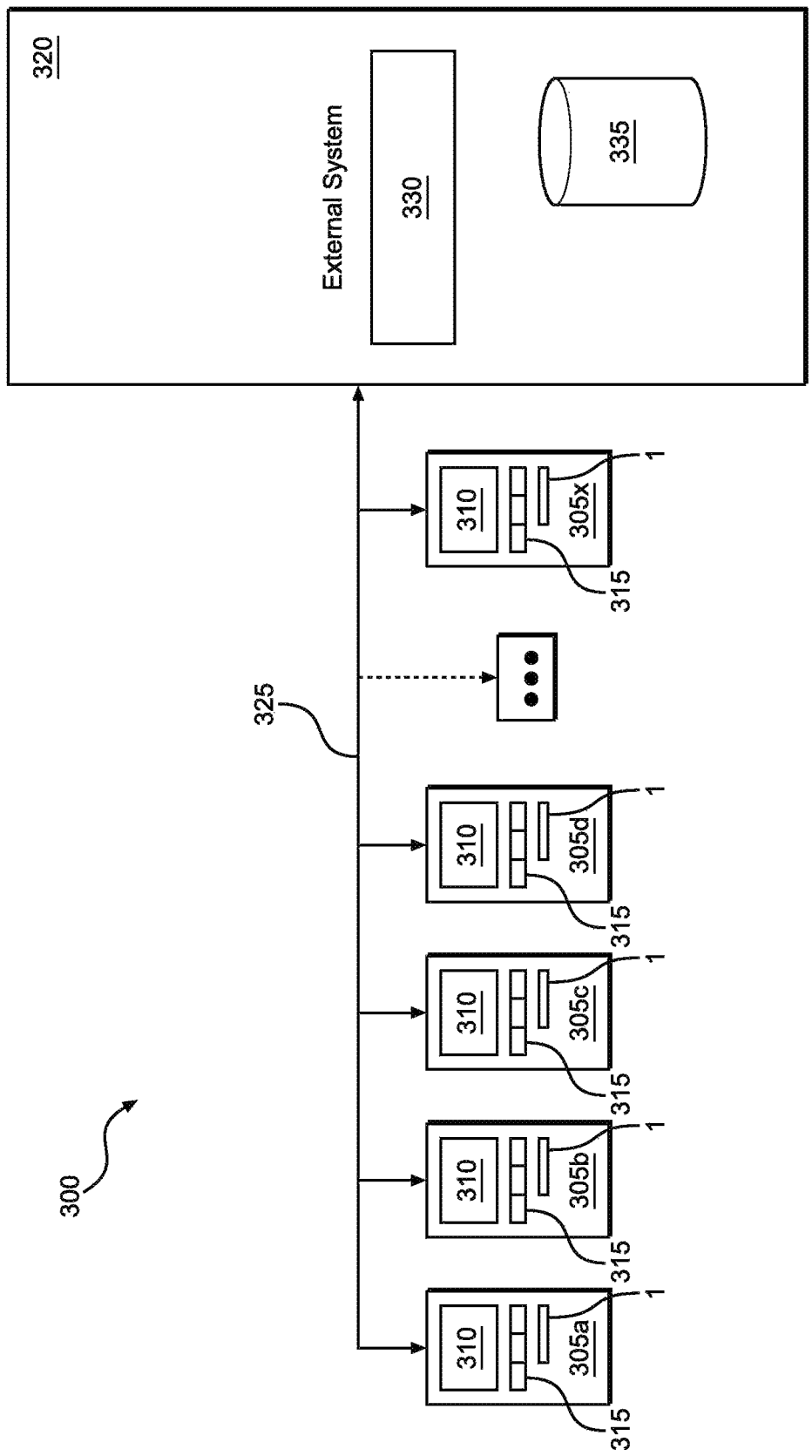
FIG. 23 is a system of electronic gaming machines on a network and connected to an external system.

FIG. 23 shows a networked system 300 of EGMs 305a-305x each including an integrated document handler 1 for accepting documents in the form of currency of various denominations and printed tickets. Each EGM 305 has a number of other components including a display 310 and buttons 315 shown on the outside of EGM 305 to allow a user to operate and interact with EGM 305. It should be understood that while an EGM is shown and described herein, document handler 1 may be included in a vending machine, an ATM, a change kiosk or another device that requires the acceptance of currency and/or documents such as printed tickets to activate the device in which document handler 1 resides, Therefore, the invention applies equally to a system of these other types of devices using document handler 1.

Networked system 300 also includes an external system 320 that is in communication with each of EGMs 305 over a network 325. Network 325 may be any type of network over which data is communicated including but not limited to a Local Area Network (LAN), Wide Area Network (WAN), an intranet or the Internet. Other proprietary networks could also be used without departing from the principles of the invention. This would include such networks as a Windows network or an Ethernet network.

External system 320 includes a controller 330 that controls operation of external system 320. Controller 330 is connected to network 325 to communicate with each of EGMs 305. A memory 335 which may be in the form of a database is also included in external system 320. Memory 335 may be used to store data including unique codes that may be printed on tickets. A code represents a value in the form of credits for play of an EGM and the ticket may be inserted into any other EGM 305 connected to system 300 so that the player may use the credited value once a ticket is authenticated by document handler 1.

As stated above, document handler 1 as described is typically sold as an integrated component with another device such as an EGM, a vending machine, an ATM, a change kiosk or another device that requires the acceptance of currency or documents to activate the device in which document handler 1 resides. Alternatively, document handler 1 may be sold separately and installed in a device for use by a purchaser. In either case, collection of the amount due to purchase document handler 1 may be made as a single, one-time payment at the time of the sale or in the form of one or more fixed payments with interest charges, as a lease or under another payment plan agreed to between the seller and the purchaser.

To ensure collection of payments where payments are made over time, the present invention is a document handler system and method with timed operation. It is intended to have the document handler be operational during a particular time period that coincides with a payment and then to become non-operational when the time period expires in the event that the next payment has not been made. In this way, a purchaser is encouraged to make timely payments while the seller is ensured that the value of the document handler is not realized by the purchaser without proper payment for it.

Figure 24:
FIG. 24 is a gaming ticket for use in a system of electronic gaming machines such as that shown in FIG. 23.

Document Handler 1 includes a validator 2 that is capable of validating a ticket inserted into document handler 1. In some cases, a player is using a ticket to load credits on an EGM 305 from a previous session of play that is memorialized on a ticket printed by a ticket kiosk or another EGM 305 with ticket printing capabilities. A ticket 400 of this type is shown in FIG. 24. Ticket 400 includes an indication of the value of the ticket 405 and a bar-code 410 representing a unique identifier code so that the ticket can be tracked by system 320 which is verified by document handler 1 in a comparison between the code and the corresponding code stored in memory 335 in system 320. Once verified, the value of ticket 400 is added to the credit meter of EGM 305 and is available for play by the player. The unique identifier code is randomly generated by system 320 at the time the ticket is printed by an EGM 305 and stored in memory 335.

Figure 19:
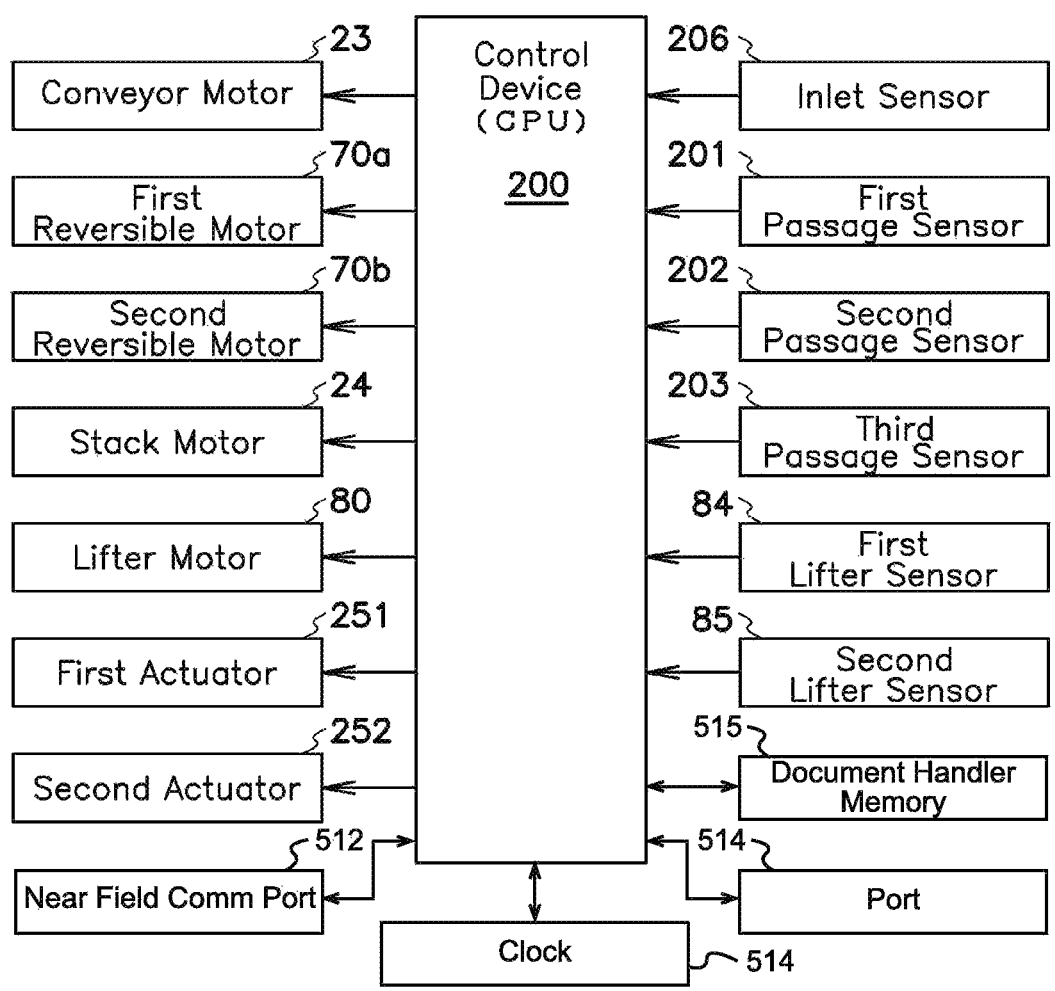
FIG. 19 is a block diagram showing the electronics of a document handler.
Figure 25:
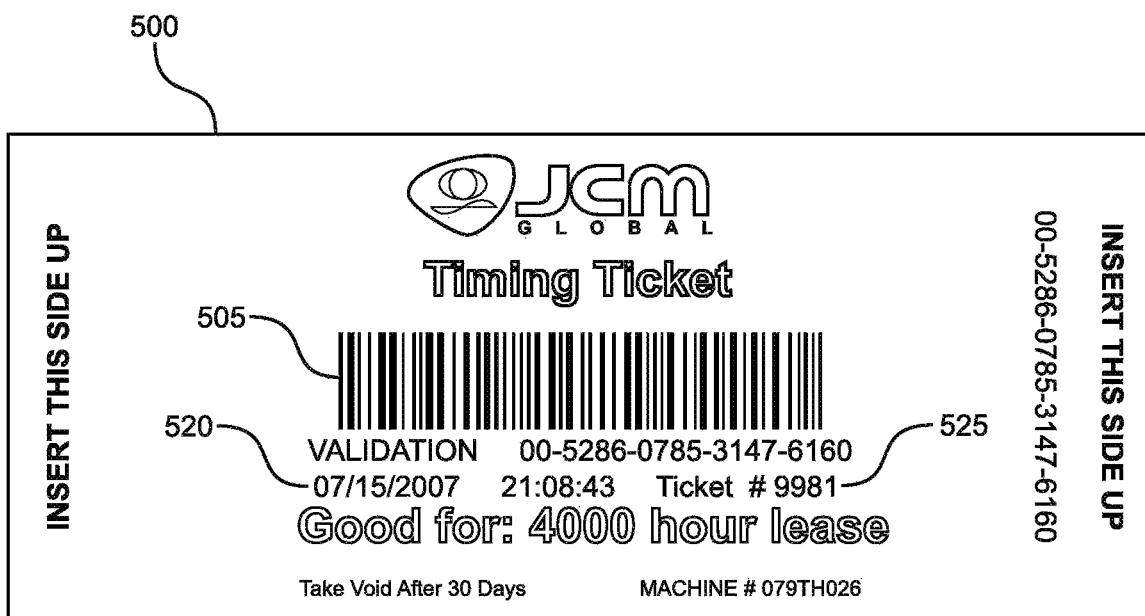
FIG. 25 is a timing ticket for activating or re-activating a document handler for a time period.

In the case where a ticket will be provided by the seller to the purchaser to extend the time of operation of document handler 1, the ticket will be in the form of a timing ticket 500, an example of which is shown in FIG. 25. Timing ticket 500 includes a code which may be in the form of a traditional bar code 505, a two dimensional bar code (not shown), a magnetic code (not shown) or another type of indicator that is unique to ticket 500. Code 505 on ticket 500 is compared against a unique code stored in document handler memory 515 (FIG. 19). The unique code may be stored in memory 515 at or before the sale of document handler 1. Alternatively, it may be placed in memory 515 at a later time through a secure link to external system 320 over network 325, directly through port 510 (e.g. USB) or through a wireless link such as a near field communication port 512 to control device 200 on document handler 1. Timing ticket 500 may also include other information such as a validation date 520, a ticket number 525, a time amount 530 in hours, days or another time period, and any other information that may be desired by the seller that seeks to control the activation of document handler 1.

Timing ticket 500 may be provided to the purchaser at an appropriate time prior to the expiration of the current time period during which document handler 1 is still operational. For example, if a document handler has been purchased with a financing plan that requires a monthly payment, the purchaser receives a timing ticket for the following month upon receipt by the seller (or financing entity) of payment for the next month. Timing ticket 500 may be sent by mail, or it may be electronically transmitted in or attached to an email, text message, or other electronic transmission. An electronic device such as a dedicated electronic code transmitter, a computer including but not limited to a laptop, a netbook, or a tablet computer, or a mobile device such as a smartphone may be used to connect to port 510 (e.g. USB) or a wireless connection (e.g. NFC port) 512 to receive a signal from the electronic device with the code to activate document handler 1. If payment is not received in a timely manner and a timing ticket is not used to extend the operation of document handler 1, document handler 1 will become inactive.

The time period itself is embedded in code 505. Once code 505 is read by validator sensor 10 of validator 2, controller 200 compares code 505 to the set of unique activation codes stored in memory 515. If the code is valid, controller 200 tracks pulses from clock 514 to synchronize the time period from code 505. When the time period expires, the document handler 1 is automatically de-activated if a new code is not input and a time period is not reset. The count value is equivalent to the desired time period corresponding to a number of clock pulses. Clock pulses may be counted until the count value is reached, or alternatively if the count value may be the starting point and each clock pulse will cause the count value to be decremented until it reaches zero.

In another application of timing ticket 500, document handler operations may be timed to determine an appropriate warranty period. There are situations where a warranty period does not start on the date of sale, but instead starts when a device in which document handler 1 resides is sold or placed in the market for commercial operation. For example, if an EGM manufacturer purchases document handler 1 and places document handler 1 in an EGM on its assembly line, the warranty period for that document handler may not begin until the EGM is sold and placed for operation in a gaming establishment. This may create a time period of days, week or months between the sale of document handler 1 and the EGM to a gaming establishment operator. In such a case, it is desirable to provide certainty as to the warranty period. This may be accomplished by providing a timing ticket to gaming establishment operator which may be inserted into document handler 1 when that document handler is first turned on for use in the gaming establishment As with the timing described above for de-activating document handler 1, clock 514 (FIG. 19) may be used to track a time period over which the warranty will be valid starting with the time that the timing ticket is inserted into document handler 1. Once inserted, an elapsed time will be tracked and the warranty will expire after a predetermined time period has elapsed. The document handler manufacturer or the gaming establishment operator may access the current count maintained by controller 200 at any time through port 510 or near field communication port 512 to check on the status of the warranty period. The warranty period may be measured in any number of ways, including but not limited to: a) an absolute number of hours, days, months or years from the time that the warranty period is started (e.g. 4,000 hours as shown on timing ticket 500 in FIG. 25); b) an amount of time that document handler 1 has actually been turned on and in use since the warranty period started; or c) the handling of a predefined number of transactions where documents are inserted into document handler 1, the count of which may also be tracked by controller 200.

Figure 26:
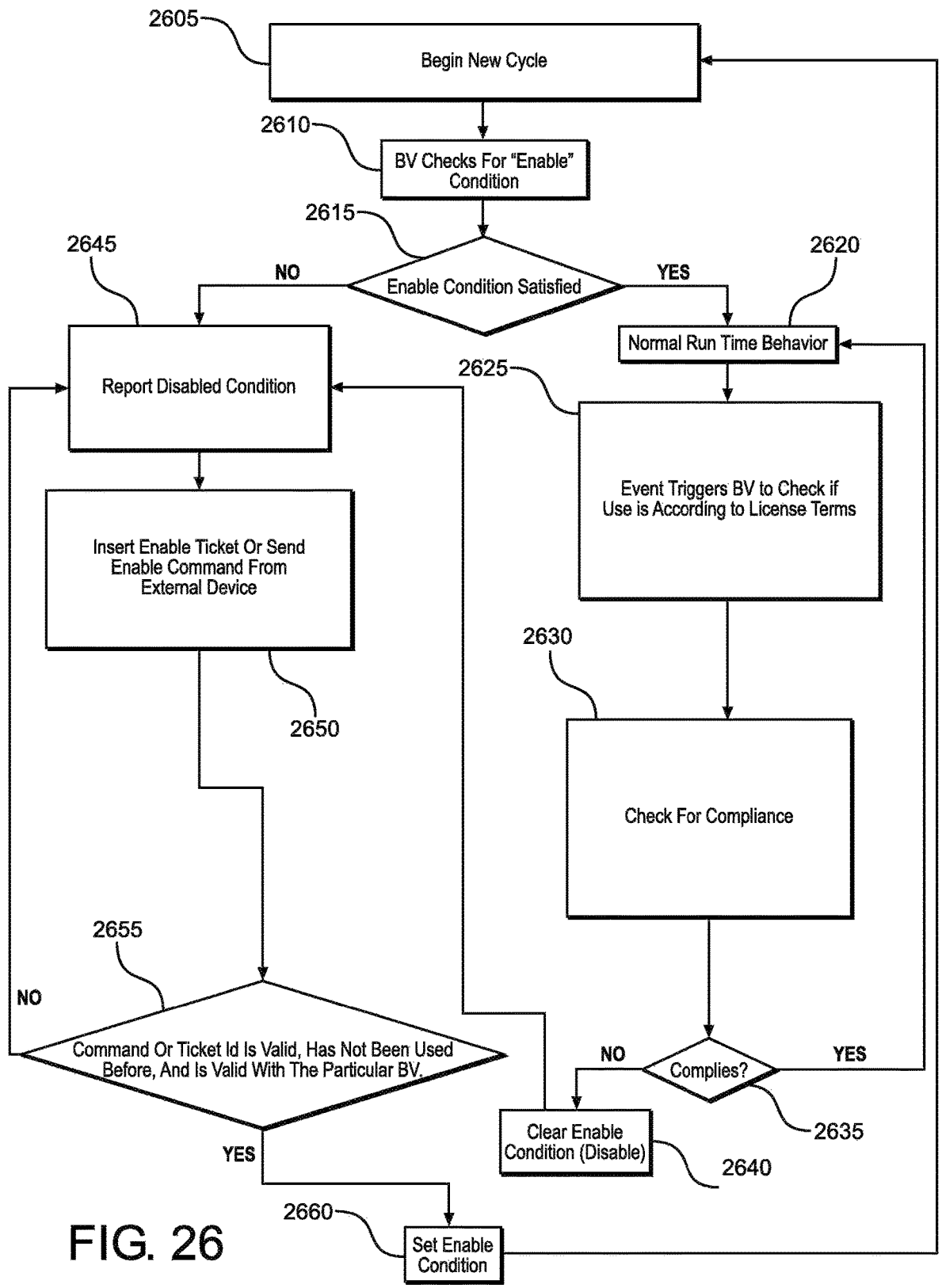
FIG. 26 is a flow chart showing the steps for use of a timing ticket.

FIG. 26 is a flow chart 2600 showing the steps for use of a timing ticket. At the beginning of a new cycle such as for example, power-up, bill insertion, etc., validator 1 is initialized at step 2605. After the new cycle begins, validator 1 checks whether an enable condition exists at step 2610. As discussed above, this would occur when a ticket 500 has been inserted enabling validator 1 at the beginning of a cycle, or where a cycle has already been initiated in which validator 1 was enabled for a time period or for a number of transactions, the maximum value for which have not yet been reached. If an enable condition is satisfied at step 2615, the flow is directed through a sequence of steps branching from step 2615 for a "yes" response to the enable condition being satisfied. If an enable condition is not satisfied (e.g. the validator has reached the end of a time period or a maximum number of transactions), a second sequence of steps occurs at step 2615, the flow is directed through a sequence of steps branching from 2615 for a "no" response.

Along the first branch where a "yes" response indicates the enable condition is satisfied, the flow proceeds such that validator 1 operates in normal mode at step 2620. From there, an event check is triggered in validator 1 at step 2625 to determine whether it is being used according to the "terms of use" or "license" between the owner/licensor of the validator and the user/licensee. A set of terms under a license that may be checked includes but is not limited to: (1) downloading new firmware; (2) power up condition; (3) detection of swapping of parts in validator 1; (4) bill insertion; (5) bill stacking activity; (6) swapping of a cashbox; or (7) passage of time. For each event, a check is made to determine whether the user is in compliance with the terms. The compliance check may include a variety of items on which to check at step 2630: (1) change of country; (2) change of protocol; (3) change of host machine, which may be detected by machine number, some type of hardware signature, or other means; (4) change of game maker (potentially detected by protocol behavior such as poll rate, sequence of initialization commands during power up or bill transactions, etc.); (5) change of bill validator serial number; (6) threshold number of transactions; (7) acceptance rate; (8) jam rate; (9) stall or slow motor; (10) encoder problem; (11) service calls or specific service done; (12) condition or quality of the LEDs (e.g. a high gain value indicates that the LEDs are becoming too dim for optimal functionality); (13) preventative maintenance failure where a customer does not maintain validator 1 within a specified time period; or (14) CRC error.

If compliance is met on all checks in step 2635, validator 1 is returned to normal run mode at step 2620 as indicated by a "yes" response to the question of whether validator 1 is in compliance at step 2635. If validator 1 is found to be non-compliant at step 2635, the enable condition is set to disable at step 2640 and the flow is sent to step 2645.

Going back to step 2615 where an enable condition is not satisfied (e.g. the validator has reached the end of a time period or a maximum number of transactions), the flow is directed through a sequence of steps branching from 2615 for a "no" response. The disabled condition is reported to the host at step 2645 and sounds or lights can be used to indicate the disabled condition on validator 1. To overcome the disabled condition, it is necessary to insert an enable ticket 500 or otherwise enable validator 1 from an external source at step 2650 using an electronic transmission including an enable signal. Electronic transmissions may come from a standalone hardware device, a computer or computing device, or server running a software application or software package or system. Transmission of the enable signal may be through a wireless interface including but not limited to Bluetooth, NFC, etc. or a wired interface including but not limited to serial, USB, etc. The enable signal may be embedded in a device which is inserted or attached to the validator. The code itself may be specific to the particular validator 1 and set to work only with the particular validator 1. In other cases, a group code may be used, for example, to start the warranty on a group of validators that are first installed and become operational at the same time in a new establishment. In another case, a device such as a server may manage a group of validators or devices such that it may generate or manage an arbitrary number of codes or licenses or tokens such that the server will only enable or allow to be enabled up to a specified number of bill validators at any given time. Once a valid code has been supplied to validator 1, validator 1 checks the code at step 2655. If it is a valid code, validator 1 is enabled or re-enabled at step 2660 and then back to the start of the cycle at step 2605. If the code is invalid, the flow returns to step 2645 where a disable condition is reported and the flow continues from there.

While the invention has been described with respect to the figures, it will be appreciated that many modifications and changes may be made by those skilled in the art without departing from the spirit of the invention. The invention is intended to provide flexibility with respect to the activation or de-activation of the document handler for different reasons and at other times. For example, in the event that a counterfeit bill problem has arisen with respect to a particular denomination of bills such as a $100 bill. In that case, an operator of the document handler or the manufacturer may partially deactivate the document handler using the invention. A set of codes may be included in memory 505 that instruct the document handler to partially de-activate. Insertion of a timing ticket with the particular code will cause such de-activation. Similarly, a corresponding activation code may be used to re-activate the document handler upon the problem being resolved. Any variation and derivation from the above description and drawings are included in the scope of the present invention as defined by the claims.

What is claimed is:

1. A document handling system for a gaming device, comprising:
   an inlet for receiving documents;
   a validation passageway for guiding the documents inserted into the inlet;
   a validation conveyor for transporting the documents along the validation passageway;
   a validation sensor for detecting optical or magnetic features of the documents transported along the validation passageway to produce detection signals;
   a network communication port configured to communicate with an external system;
   a control device in communication with the network communication port; and
   a clock in electronic communication with the control device for tracking a license time period of a license to use the document handling system;
   wherein:
      the control device is configured to store a first determination whether the license time period has elapsed;
      the control device is configured to store a second determination whether the document handling system is being used in compliance with the license while the license time period has not elapsed wherein the second determination includes evaluating at least one of: a change of country, a change of protocol, a change of host machine, a change of game maker rate, a stall, a slow motor, an encoder problem, a service call, a condition of a light-emitting diode, a preventative maintenance failure, or a cyclic redundancy check error;
      the document handling system is configured to reject a received document when the first determination indicates that the license time period has elapsed or the second determination indicates that the document handling system is not in compliance with the license; and
      otherwise, the document handling system is configured to accept the received document.

2. The document handling system of claim 1, wherein the document handling system transmits a notice associated with rejection of the received document to the external system.

3. The document handling system of claim 1, wherein the document handling system reports a notice of a disabled condition for the document handling system to the external system upon rejection of the received document.

4. The document handling system of claim 1, wherein the control device is further configured to:
   receive an enable command from the external system; and
   extend the license time period in response to the enable command.

5. The document handling system of claim 1, wherein the protocol behavior includes a poll rate or a sequence of initialization commands during power up or bill transactions.

6. The document handling system of claim 1, wherein the license time period tracked by the clock corresponds to a financial payment.

7. The document handling system of claim 1, wherein the received document is a ticket.

8. A document handling system for a gaming device, comprising:
   an inlet for receiving documents;
   a validation passageway for guiding the documents inserted into the inlet;
   a validation conveyor for transporting the documents along the validation passageway;
   a validation sensor for detecting optical or magnetic features of the documents transported along the validation passageway to produce detection signals;
   a network communication port configured to communicate with an external system;
   a control device in communication with the network communication port; and
   a clock in electronic communication with the control device for tracking a license time period of a license to use the document handling system;
   wherein:
      the control device is configured to store a first determination whether the license time period has elapsed;
      the control device is configured to store a second determination whether the document handling system is being used in compliance with the license wherein the second determination includes evaluating at least one of: a change of country, a change of protocol, a change of host machine, a change of game maker detected by protocol behavior, a change of bill validator serial number, an acceptance rate, a jam rate, a stall, a slow motor, an encoder problem, a service call, a condition of a light-emitting diode, a preventative maintenance failure, or a cyclic redundancy check error; and
      the document handling system is configured to reject a received document when the first determination indicates that the license time period has elapsed or the second determination indicates that the document handling system is not in compliance with the license.

9. The document handling system of claim 8, wherein the document handling system is configured to switch to a disabled condition when the license time period has elapsed or when the document handling system is not in compliance with the license.

10. The document handling system of claim 9, wherein the document handling system transmits a notification of the disabled condition to the external system.

11. The document handling system of claim 8, wherein:
    the received document is a ticket; and
    the document handling system is configured to accept currency received after determining that the license time period has elapsed.

12. The document handling system of claim 8, wherein the document handling system is configured to switch to a disabled condition upon receipt of a signal from the external system.

13. The document handling system of claim 8, wherein the document handling system is configured to process types of documents other than a ticket and currency.

14. The document handling system of claim 8, wherein the control device is configured to determine at least one of whether the license time period has elapsed or whether the document handling system is being used in compliance with the license to use the document handling system by communicating with the external system.

15. A document handling system for a gaming device, comprising:
    an inlet for receiving documents;
    a validation passageway for guiding a document inserted into the inlet;
    a validation conveyor for transporting the document along the validation passageway;
    a validation sensor for detecting optical or magnetic features of the document transported along the validation passageway to produce detection signals;
    a network communication port configured to communicate with an external system;
    a control device in communication with the network communication port; and
    a clock in electronic communication with the control device for tracking a license time period of a license to use the document handling system;
    wherein:
        the control device is configured to store a first determination whether the license time period has elapsed;
        the control device is configured to store a second determination whether the document handling system is being used in compliance with the license while the license time period has not elapsed wherein the second determination includes evaluating at least one of: a change of country, a change of protocol, a change of host machine, a change of game maker detected by protocol behavior, a change of bill validator serial number, an acceptance rate, a jam rate, a stall, a slow motor, an encoder problem, a service call, a condition of a light-emitting diode, a preventative maintenance failure, or a cyclic redundancy check error; and
        the document handling system is configured to accept or reject a received document based upon the first determination or the second determination.

16. The document handling system of claim 15, wherein:
    the received document is a first document of a first type; and
    the document handling system processes a second document of a second type regardless of the first determination and the second determination.

17. The document handling system of claim 15, wherein:
    the received document is a first document of a first type; and
    the document handling system processes a second document when the second determination indicates that the document handling system is not in compliance with the license.

18. The document handling system of claim 17, wherein the document handling system processes the second document when the second determination indicates that the document handling system is in compliance with the license.

19. The document handling system of claim 17, wherein:
    the first document is a first type of ticket; and
    the second document is a second type of ticket.

20. The document handling system of claim 15, wherein the control device receives at least one of the first determination or the second determination from the external system.

* * * * *